US012657586B2

(12) United States Patent
Soman et al.

(10) Patent No.: US 12,657,586 B2
(45) Date of Patent: *Jun. 16, 2026

(54) DIGITAL POLICY CRITERIA INTEGRATION FOR MAKING DETERMINATIONS WITHIN AN INTER-NETWORK FACILITATION SYSTEM

(71) Applicant: Chime Financial, Inc., San Francisco, CA (US)

(72) Inventors: Siddhi Soman, San Francisco, CA (US); Steven Holinaty, Port Moody (CA); Anthea Maniulit, Walnut Creek, CA (US); Devadas Mallya, Mountain View, CA (US); Matteo Vinci, San Francisco, CA (US); Sumanth Thikka, Sunnyvale, CA (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/818,348

(22) Filed: Aug. 28, 2024

(65) Prior Publication Data

US 2025/0173722 A1     May 29, 2025

Related U.S. Application Data

(63) Continuation of application No. 17/664,829, filed on May 24, 2022, now Pat. No. 12,079,811.

(51) Int. Cl.
*G06Q 20/40* (2012.01)
(52) U.S. Cl.
CPC ................................ *G06Q 20/4014* (2013.01)

(58) Field of Classification Search
CPC .................................................. G06Q 20/4014
See application file for complete search history.

(56) References Cited

U.S. PATENT DOCUMENTS

| | | | |
|---|---|---|---|
| 11,544,716 B2 * | 1/2023 | Martinez-Guarneros | ................... G06Q 20/407 |
| 2007/0220600 A1 * | 9/2007 | de Graaf | ............. H04L 63/1441 726/22 |
| 2016/0300214 A1 * | 10/2016 | Chaffin | ................... G06Q 20/02 |
| 2017/0053278 A1 * | 2/2017 | Gerard | ................. G06Q 20/407 |

(Continued)

FOREIGN PATENT DOCUMENTS

| | | | | |
|---|---|---|---|---|
| WO | WO-2017197093 A1 * | 11/2017 | ........... | G06Q 30/016 |
| WO | WO-2023168222 A1 * | 9/2023 | ............. | G06N 20/20 |

OTHER PUBLICATIONS

U.S. Appl. No. 17/664,829, Mar. 4, 2024, Office Action.
U.S. Appl. No. 17/664,829, May 13, 2024, Notice of Allowance.

*Primary Examiner* — Paul S Schwarzenberg
(74) *Attorney, Agent, or Firm* — Nicholson De Vos Webster & Elliott LLP

(57) ABSTRACT

The present disclosure relates to systems, non-transitory computer-readable media, and methods for relaying payloads with digital policy criteria for dispute requests of network transactions from a first digital system to a second digital system, for the second digital system to automatically implement the digital policy criteria. In particular, in one or more embodiments, the disclosed system receives payloads comprising digital policy criteria and policy identifier(s) and determines whether to approve or deny dispute requests based on incoming dispute requests.

20 Claims, 8 Drawing Sheets

(56)     References Cited

U.S. PATENT DOCUMENTS

| | | | | |
|---|---|---|---|---|
| 2020/0286054 A1* | 9/2020 | Umezu | ................. | G06Q 20/346 |
| 2020/0364713 A1* | 11/2020 | Douglas | .............. | G06Q 20/405 |
| 2021/0174366 A1* | 6/2021 | Zeng | .................. | G06Q 20/4016 |
| 2021/0390545 A1* | 12/2021 | Martinez-Guarneros | ................... | |
| | | | | G06Q 20/407 |
| 2022/0230174 A1* | 7/2022 | Khare | .................. | G06Q 50/182 |
| 2023/0316064 A1* | 10/2023 | Margolin | ................. | G06N 3/08 |
| | | | | 706/22 |

* cited by examiner

DIGITAL POLICY CRITERIA INTEGRATION FOR MAKING DETERMINATIONS WITHIN AN INTER-NETWORK FACILITATION SYSTEM

CROSS-REFERENCE TO RELATED APPLICATIONS

The present application is a continuation of U.S. application Ser. No. 17/664,829, filed on May 24, 2022. The aforementioned application is hereby incorporated by reference in its entirety.

BACKGROUND

As online transactions have increased in recent years, network-transaction-security systems have increasingly used computational models to detect and protect against cyber fraud, cyber theft, or other network security threats that compromise encrypted or otherwise sensitive information. For example, as such network security risks have increased, existing network-transaction-security systems have employed more sophisticated computational models to detect security risks affecting transactions, account balances, personal identity information, and other information over computer networks that use computing devices. For example, when a device submits a claim disputing a network transaction as unauthorized or illegitimate, some existing network-transaction-security systems execute heuristic computational models to determine whether or not to approve such a dispute claim. To illustrate, some conventional network-transaction-security systems can apply heuristic computational models with instructions to implement established policies to determine a reliability of a dispute claim.

Although conventional network-transaction-security systems can process dispute claims, such systems implement heuristic computational models inhibited by inflexible and hard-coded rules, inefficient model adjustments, and unnecessary proliferation of back-and-forth graphical user interfaces. As just suggested, for instance, conventional network-transaction-security systems inflexibly apply established policies without variance to dispute claims-regardless of timing or the nature of the network transaction being disputed. Because heuristic computational models use hard coded rules, conventional network-transaction-security systems often lack the flexibility to apply certain policies or a machine learning approach to one subset of dispute claims and different policies or a different machine learning approach to another subset of dispute claims. Such a one-size-fits-all approach to network-transaction-security systems can inhibit conventional systems from integrating new machine learning approaches or other intelligent technologies to resolve dispute claims.

In addition to the rigidity of a heuristic computational model, conventional network-transaction-security systems often inefficiently adapt to changes or customization to hard-coded criteria. For example, conventional network-transaction-security systems can receive numerous requests to change digital policies for processing dispute claims. To change such hard-coded criteria, however, conventional network-transaction-security systems divert computational resources to inefficiently re-write and re-deploy computer code. While the code for a heuristic computational model is being re-written, for instance, the model cannot process dispute claims. Because changing hard-coded criteria for a heuristic computational model can take days, months, or longer, in some cases, existing network-transaction-security systems deploy models with outdated or irrelevant policies that may incorrectly determine whether to accept or reject dispute claims. Indeed, an error in hard-coded criteria for a heuristic computational model can cause conventional systems to render inaccurate automated decisions on dispute claims.

In part due to the hard coding of conventional network-transaction-security systems, such systems often implement transaction thresholds or minimum-standard rules that fail to automatically resolve dispute claims and, consequently, push unresolved dispute claims to computing devices and graphical user interfaces of agents. In some cases, for instance, conventional network-transaction-security systems relay unresolved dispute claims to devices that present graphical user interfaces with multi-factor options or tools and various graphical user interfaces to facilitate resolving dispute claims. Devices in conventional network-transaction-security systems can shuffle through multiple graphical user interfaces to process dispute claims. Further, such systems deploy separate graphical user interfaces for coders to re-write computer code when digital criteria are updated or changed. These along with additional problems and issues exist with regard to conventional network-transaction-security systems.

BRIEF SUMMARY

This disclosure describes embodiments of systems, methods, and non-transitory computer-readable storage media that can solve one or more of the foregoing (or other problems) in the art. In particular, the disclosed systems relay payloads with digital policy criteria for dispute requests of network transactions—from a first digital system to a second digital system—for the second digital system to automatically implement the criteria and approve or deny dispute requests. For example, the disclosed system receives from a first digital system (e.g., a digital inspection system) a payload that includes digital policy criteria and at least one policy identifier. After receiving dispute-request values from the digital inspection system that correspond with a dispute request and the policy identifier, a second digital system (e.g., a digital service policy system) determines whether to approve or deny the dispute request. By relaying new, updated, or artificially intelligent policy criteria through payloads between digital systems—along with dispute-request values for a dispute request—the disclosed system can flexibly implement various policy criteria on the fly as well as render and send automatic approval or denial determinations to the digital inspection system.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
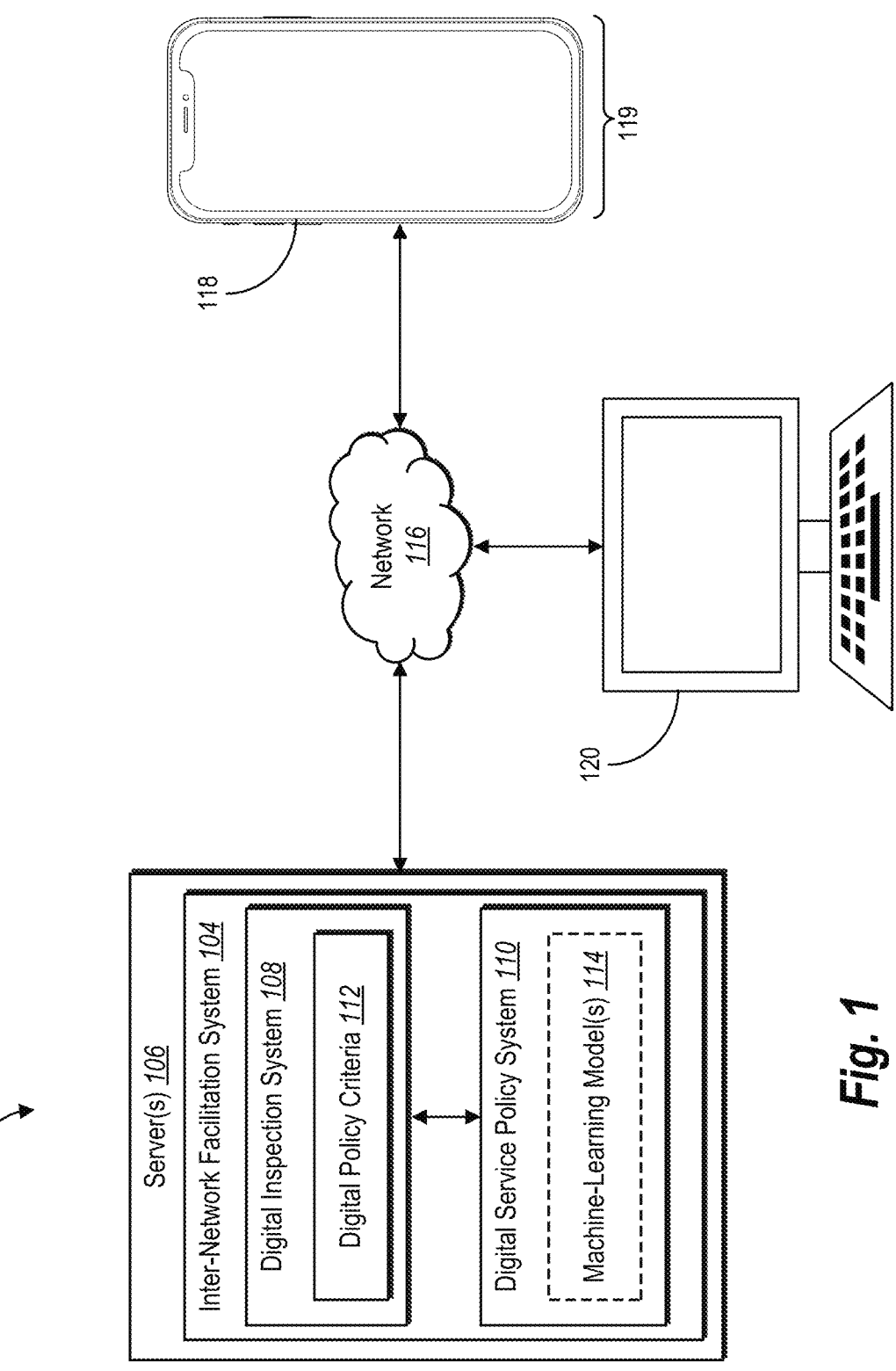
FIG. 1 illustrates a diagram of an environment in which an inter-network facilitation system—and its subsystems including a digital inspection system and a digital service policy system—can operate in accordance with one or more embodiments.

This disclosure describes one or more embodiments of an inter-network facilitation system that relays digital policy criteria from a digital inspection system to a digital service policy system for implementation of updated, changed, new, or artificially intelligent digital policy criteria to dispute-request values. By exchanging data between a digital inspection system and a digital service policy system as subsystems, the inter-network facilitation system can implement the digital policy criteria on the fly and automatically determine whether to approve or deny the dispute request. For example, the digital service policy system receives from the digital inspection system payloads that have digital policy criteria and a policy identifier for at least one of the digital policy criteria. Furthermore, the digital service policy system can apply different digital policy criteria from dispute request to dispute request. Specifically, digital policy criteria can include a machine learning model, and the digital service policy system can apply the digital policy criteria to generate a machine learning prediction for determining whether to approve or deny a dispute request.

As suggested above, the inter-network facilitation system includes a couple of subsystems—the digital inspection system and the digital service policy system. The digital inspection system sends data concerning dispute requests and payloads having digital policy criteria and policy identifiers to the digital service policy system. Based on receiving such data, the digital service policy system applies the digital policy criteria to dispute-request values received from the digital inspection system. For example, in some embodiments, the digital service policy system maps the dispute-request values. In some such cases, the dispute-request values have a corresponding policy criterion identifier that guides the digital service policy system in mapping the dispute-request value to the correct policy criterion. In particular, the inter-network facilitation system maps the dispute-request value to a corresponding policy criterion based on the policy criterion identifier to aid in determining whether to approve or deny the dispute request.

After applying digital policy criteria to dispute-request values, the digital service policy system determines whether to approve or deny the dispute request based on the dispute-request values and the digital policy criteria. For example, the digital service policy system determines whether to approve or deny the dispute request by generating a score from the dispute-request values. In particular, the generated score can assist the digital service policy system in determining whether to approve or deny the dispute request. To illustrate, the digital service policy system can determine whether the generated score satisfies a scoring threshold.

If the digital service policy system determines to deny the dispute request, in some cases, the digital service policy system sends an indicator of that denial decision to the digital inspection system. Having received the indicator, the digital inspection system subsequently sends the dispute request to a device queue. Dispute requests in the device queue can undergo processing by an agent device to make a customized decision on a particular dispute request.

By contrast, if the digital service policy system determines to approve the dispute request, the digital service policy system sends an indicator of the approval decision to the digital inspection system. In response to the approval decision, in some cases, the digital inspection system automatically credits a value to a user account corresponding to the dispute request. Automatic crediting can include a final credit or a provisional credit to the user account corresponding to the dispute request.

In contrast to successfully determining whether to approve or deny a dispute request, in some cases, the inter-network facilitation system can identify for a given dispute request when the digital service policy system fails to render an approval or denial determination. In this situation, the inter-network facilitation system diverts the given dispute request from the digital service policy system to a heuristic model (e.g., within the digital inspection system) and can determine whether to approve or deny the given dispute request using the heuristic model for dispute-request values.

Regardless of how the inter-network facilitation system approves a dispute request, the digital inspection system can automatically credit a value to a user account. For example, the digital inspection system credits a value from a network transaction indicated by a dispute request to a user account and notifies the user of the credit. In some cases, the digital inspection system can delay crediting the value to the user account. To illustrate, the digital inspection system can use a randomized generator to generate a time period (e.g., number of days) to wait before automatically crediting the value to the user account.

As further mentioned, the digital service policy system can utilize machine learning models. For example, the digital service policy system can select a machine learning model according to a digital policy criterion from the digital policy criteria. In particular, the digital service policy system can use the machine learning model to generate a machine learning prediction and determine whether to approve or deny a dispute request based on the machine learning prediction. To illustrate, in some cases, the digital service policy system selects one or more of (i) a machine learning model that determines a likelihood of approval for a given dispute request or (ii) a machine learning model that determines a likelihood of the dispute request being fraudulent. Moreover, the digital service policy system can utilize multiple machine learning models to generate multiple machine learning predictions and approve or deny a dispute request based on a combination of the machine learning predictions.

The inter-network facilitation system provides many advantages and benefits over conventional network-transaction-security systems and methods. As noted above, conventional network-transaction-security systems consume significant computational resources to re-write digital policy criteria. By contrast, the inter-network facilitation system improves flexibility of implementing new or diverse digital policy criteria relative to conventional network-transaction-security systems by relaying, from the digital inspection system to a digital service policy system, a payload comprising digital policy criteria and a policy identifier for at least one of the digital policy criteria. Specifically, the inter-network facilitation system can flexibly and quickly modify existing digital policy criteria by relaying a payload with the digital policy criteria and a policy identifier between a first digital system (e.g., a digital inspection system) and a second digital system (e.g., a digital service policy system). By relaying a payload including new, updated, or changed digital policy criteria distinct from the previous digital policy criteria on the digital inspection system, the inter-network facilitation system quickly modifies or changes to different digital policy criteria. In response to receiving the payload with new, updated, or changed digital policy criteria, the digital service policy system can quickly and automatically implement the digital policy criteria on incoming dispute-request values. Rather than consume computational resources to re-write or overwrite code, therefore, the digital service policy system provides for a flexible and quick method of changing digital policies without re-writing and re-deploying computer code.

As an illustration of such quick and automatic policy-criteria changes, the digital service policy system can quickly adjust the digital policy criteria to identify a new (or previously unused) machine learning model that generates a machine learning prediction (i) relating to a likelihood of the dispute request being fraudulent or (ii) relating to a dispute request's likelihood of approval. Rather than re-write a dispute-request flow to implement such machine learning models, the digital service policy system can immediately utilize the machine learning predictions to apply to incoming dispute-request values. By relaying a payload with a policy identifier that points to a machine learning model, the digital policy criteria on the digital service policy system can easily identify the machine learning model as a factor in determining whether to approve a dispute request. Accordingly, the time for changes to digital policy criteria can take minutes rather than the days or months it would take on conventional network-transaction-security systems.

In addition to improving flexibility, the inter-network facilitation system also improves the computing speed for implementing new or updated digital policy criteria. Indeed, the inter-network facilitation system can implement new or updated digital policy criteria in real time or near-real time. For instance, the inter-network facilitation system can in real-time or near real-time relay a payload with digital policy criteria, change the digital policy criteria, and apply the changes to the digital policy criteria to incoming dispute-request values. Instead of hours or days consumed by conventional network-transaction-security systems to re-write or re-deploying computer code to change a digital policy, the inter-network facilitation system can relay a payload and implement a corresponding digital policy within minutes or seconds. As a result of more quickly implementing new or changed digital policy criteria as compared to hard-coded heuristic models, the inter-network facilitation system can utilize more relevant digital policy criteria.

Because the digital service policy system determines whether to approve or deny the dispute request and sends the approval or denial determination to the digital inspection system, the inter-network facilitation system reduces the number of dispute requests sent to agent devices and thereby reduces network traffic. For example, in response to an approval determination, the digital inspection system can automatically credit a user account rather than sending the dispute request to a queue for further processing. This reduces the number of graphical user interfaces an agent device of the inter-network facilitation system would need to shuffle through in order to process the dispute requests.

As illustrated by the foregoing discussion, the present disclosure utilizes a variety of terms to describe features and advantages of the inter-network facilitation system. Additional detail is now provided regarding the meaning of such terms. For example, as used herein, the term "digital inspection system" refers to a computing system for processing or analyzing network transactions or digital requests concerning network transactions. In particular, a digital inspection system can include a computing system that processes or relays dispute requests according to a set of policies. To illustrate, the digital inspection system can include and transmit digital policy criteria for determining whether the dispute request contains pending network transactions corresponding with a dispute request, whether the dispute request includes one or more additional dispute requests associated with the dispute request, whether the dispute request contains an onsite-machine transaction, or whether one or more network transactions associated with the dispute request satisfies a transaction threshold.

As used herein, the term "digital service policy system" refers to a computing system that implements digital policies or digital policy criteria on values received from other computing systems. In particular, the digital service policy system can adjust policies integrated from other environments and apply the adjusted policies to requests and make determinations based on those adjusted policies. To illustrate, the digital service policy system can receive a digital policy criterion relating to determining whether one or more network transactions associated with the dispute request satisfies a transaction threshold and can utilize a machine learning prediction to determine whether to approve the dispute request based in part on the transaction threshold. Moreover, the digital service policy system can utilize machine learning models to make intelligent determinations relating to dispute requests based on digital policy criteria identifying particular machine learning models.

As previously mentioned, the digital inspection system sends payloads with digital policy criteria. As used herein, the term "payload" refers to a data packet that is sent or transmitted from a sending computing device to a recipient computing device for storage or execution at the recipient computing device. In particular, a payload can include data entries relating to digital policies. For example, a payload can contain digital policy criteria relating to dispute request automation and policy identifiers, and the digital inspection system can send the payload to the digital service policy system.

As just mentioned, a payload can include digital policy criteria. As used herein, the term "digital policy criteria" refers to criteria for a scheme of acting on service requests for digital services. In particular, digital policy criteria can include one or more criteria for a digital system automatically determining an action for a dispute request or otherwise automatically determining a response to a service request for a digital service. To illustrate, digital policy criteria can specify that a dispute request has no pending network transactions corresponding with the dispute request, no on-site machine transactions, and/or no additional dispute requests associated with the dispute request.

As discussed above, digital policy criteria correspond to policy identifier(s). As used herein, the term "policy identifier" refers to a code, name, number, alphanumeric, or other identifier of a digital policy criteria. In particular, policy identifier can include a name, number, or other code that points to a digital policy for automated dispute requests. To illustrate, the policy identifier for the digital policy criteria can be "granting provisional credit" or "automating dispute requests." Depending on the policy identifier, the inter-network facilitation system maps subsequent dispute-request values with the corresponding policy identifier.

As used herein, the term "policy criterion identifier" refers to a code, name, number, alphanumeric, or other identifier of a digital policy criterion. In particular, policy criterion identifier can include a name, number, or other code that points to a digital policy criterion for automated dispute requests. The inter-network facilitation system can use a policy criterion identifier for each digital policy criterion. To illustrate, a dispute-request value of $20.00 can include the policy criterion identifier of "amount."

As discussed above, the inter-network facilitation system determines whether to approve or deny dispute requests. As used herein, the term "dispute request" refers to a digital claim or complaint submitted by an account that disputes or otherwise indicates an issue with one or more network transactions. For instance, a dispute request can include a claim disputing an authenticity, authorization, control, or other legitimacy of one or more network transactions. For example, the dispute request could claim that a network transaction was not authorized (e.g., that an account-takeover event occurred). The dispute request can include data corresponding with a disputed transaction, for example, a merchant (and merchant information) associated with the disputed transaction, an amount of the disputed transaction, status of the disputed transaction (e.g., pending or settled), an indication of a dispute classification, the date and/or time of the disputed transaction, transaction identification numbers or codes, as well as any other metadata associated with the disputed transaction.

As further used herein, the term "dispute-request values" refers to one or more numbers, entries, binary indicators, or other data associated with a dispute request. In particular, dispute-request values can include number or Boolean results associated with an amount, linked dispute (one or more additional dispute requests associated with the dispute request), account age, transaction history, number of transactions, on-site machine transactions, or pending network transactions corresponding with the dispute request. To illustrate, a Boolean result associated with an on-site machine transaction can use FALSE for absent and TRUE for present. Whereas for amount, the dispute-request value uses a numerical value, such as $20.00.

As discussed above, the digital inspection system can receive a denial determination for a dispute request and place the dispute request in a device queue. As used herein, the term "device queue" refers to a queue for computing devices processing dispute requests. In particular, the inter-network facilitation system can send a dispute request to the device queue in response to the digital service policy system denying a dispute request. To illustrate, if a dispute request includes a value that does not satisfy a particular threshold for automated decision-making by the digital service policy system, then the inter-network facilitation system can determine to place the dispute request in a device queue.

As further used herein, the term "crediting" refers to granting an account monetary value for a specific amount. In particular, crediting can include granting a provisional credit or a final credit to a user account. To illustrate, for a dispute request where the dispute request satisfies digital policy criteria as determined by the digital service policy system, the inter-network facilitation system can determine to grant a final credit corresponding to the dispute request amount.

As also used herein, the term "linked dispute" refers to a dispute request associated with another dispute request or a dispute request for a network transaction that is also disputed by another dispute request. In particular, if the inter-network facilitation system had received a prior dispute request that disputes a network transaction and receives a subsequent dispute request that also disputes the network transaction, then the inter-network facilitation system considers both dispute requests as linked disputes.

As further used herein, the term "transaction threshold" refers to a set amount or value for a network transaction that qualifies the network transaction for consideration of automatic approval of a dispute request. In particular, the inter-network facilitation system can use the transaction threshold to automatically approve dispute requests below a certain amount. To illustrate, the inter-network facilitation system can utilize the transaction threshold as one of the digital policy criteria for automatically approving a dispute request.

As also used herein, the term "machine learning model" refers to a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, linear regressions, logistic regressions, random forest models, or neural networks (e.g., deep neural networks).

Finally, as used herein, the term "machine learning prediction" refers to a score, classification, or other output by a machine learning model. In particular, a machine learning prediction can include a score, classification, or other output predicting approval or denial of a dispute request, predicting a dispute request as fraudulent, or predicting a user account characteristic.

Additional detail regarding the inter-network facilitation system will now be provided with reference to the figures. In particular, FIG. 1 illustrates a block diagram of a system environment 100 (or environment 100) for implementing an inter-network facilitation system 104 in accordance with one or more embodiments. As shown in FIG. 1, the environment 100 includes server(s) 106 implementing a digital inspection system 108 and a digital service policy system 110 as part of the inter-network facilitation system 104. The environment 100 of FIG. 1 further includes a client device 118 comprising a device application 119 and an agent device 120. The digital inspection system 108 includes digital policy criteria 112 and the digital service policy system 110 can include or interact with machine learning model(s) 114. The server(s) 106 can include one or more computing devices to implement the inter-network facilitation system 104. Additional description regarding the illustrated computing devices (e.g., the server(s) 106, the agent device 120 and/or the client device 118) is provided with respect to FIGS. 7-8 below.

As shown, the inter-network facilitation system 104 utilizes a network 116 to communicate with the client device 118 and/or the agent device 120. The network 116 may comprise a network as described in relation to FIGS. 7-8. For example, the inter-network facilitation system 104 communicates with the client device 118 to provide and receive information pertaining to various client transactions and communicates with the agent device 120 for receiving dispute requests and dispute-request values. Indeed, the inter-network facilitation system 104 can receive a dispute request via the digital inspection system 108, send the dispute request to the digital service policy system 110, and determine whether to approve or deny the dispute request by the digital service policy system 110. The digital service policy system 110 can then send an indication of that decision to the digital inspection system 108.

In one or more embodiments, the inter-network facilitation system 104 communicates with the client device 118 or the agent device 120 in response to receiving a dispute request. In particular, the inter-network facilitation system 104 provides an indication of a secured account to indicate that the client device 118 is authorized to dispute a request pertaining to the digital account. In addition, the inter-network facilitation system 104 communicates with the client device 118 and the agent device 120 to determine permissions of the client device 118. For example, the inter-network facilitation system 104 provides information to the digital inspection system 108 and the digital service policy system 110, such as direct deposit status, transaction information, digital account updates, device fee information, check status, interaction history, transaction status, activation, etc.

As indicated by FIG. 1, the client device 118 includes the device application 119. In particular, the device application 119 can include a web application, a native application installed on the client devices 118 (e.g., a mobile application, a desktop application, etc.), or a cloud-based application where all or part of the functionality is performed by the server(s) 106. In some embodiments, the inter-network facilitation system 104 communicates with the client device 118 through the device application 119. This communication, for example, receives and provides account information and transaction information including direct deposit status, digital account updates, device fee information, check status, interaction history, transaction status, activation, etc. As shown, the inter-network facilitation system 104 can provide options to dispute transactions, digital account information and secured account information for display within a graphical user interface associated with the device application 119. As indicated above, the inter-network facilitation system 104 uses the digital inspection system 108 and the digital service policy system 110 to apply digital policy criteria to a dispute request from the client device 118.

As shown in FIG. 1, the client device 118 implements the device application 119 in conjunction with interaction with the inter-network facilitation system 104. For example, the inter-network facilitation system 104 can monitor the activities of the device application 119. In particular, these activities can include events, such as time spent on device application 119, recently viewed pages on device application 119, recently viewed transaction on the device application 119, attempted dispute requests, account updates, etc.

Although FIG. 1 illustrates the environment 100 having a particular number and arrangement of components associated with the inter-network facilitation system 104, in some embodiments, the environment 100 may include more or fewer components with varying configurations. For example, in some embodiments, the inter-network facilitation system 104 can communicate directly with the client device 118, and/or the device application 119, bypassing the network 116. In these or other embodiments, the inter-network facilitation system 104 can be implemented (entirely on in part) on the client device 118. Additionally, the inter-network facilitation system 104 can include or communicate with a database for storing information, such as recent direct deposits, ATM withdrawals, debit, or credit transactions, pending transactions, digital account updates, interaction history, and/or other information described herein.

Figure 2:
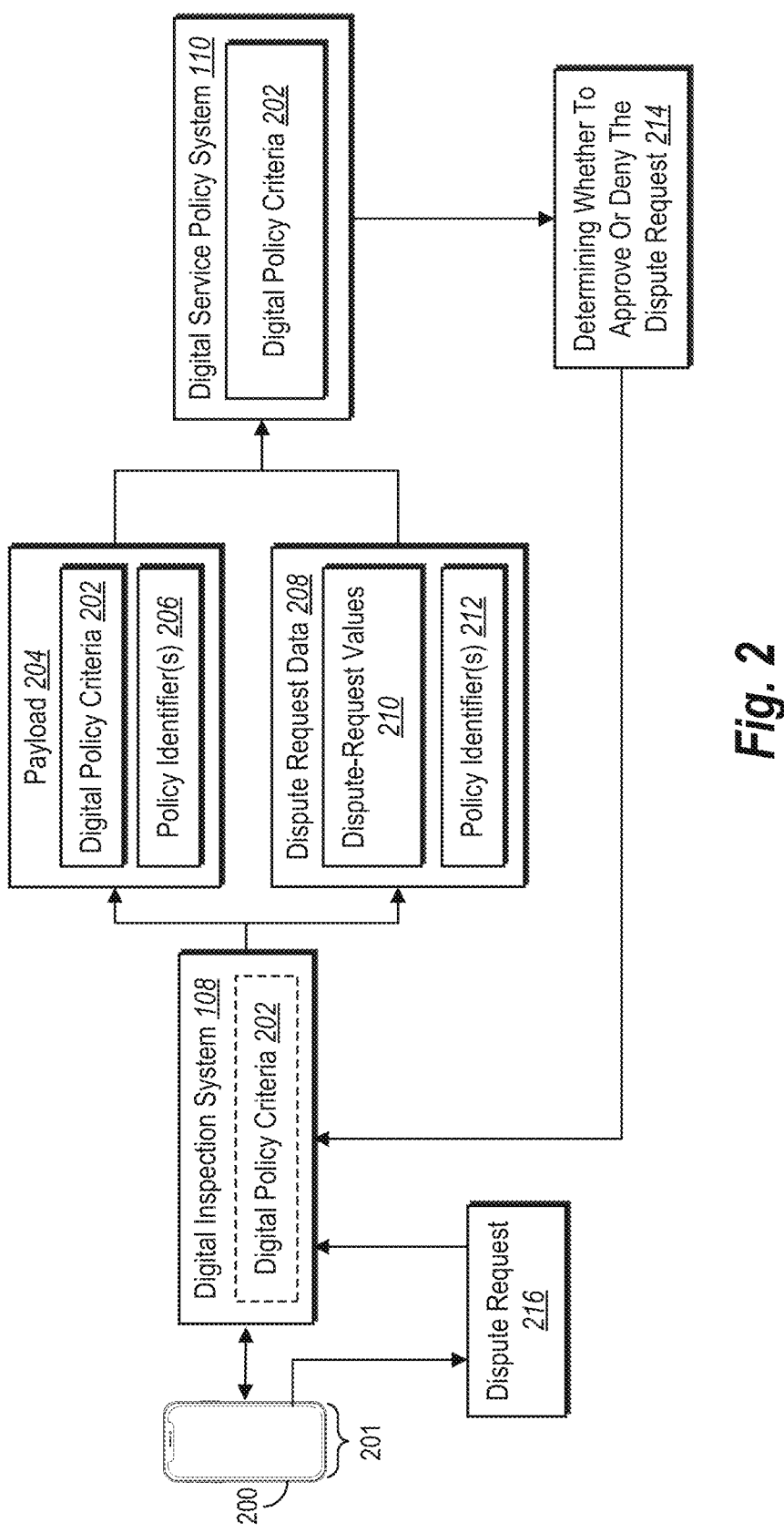
FIG. 2 illustrates an example diagram of the inter-network facilitation system relaying a payload comprising digital policy criteria from a first digital system to a second digital system to automatically implement the digital policy criteria for a dispute request and determine whether to approve or deny the dispute request in accordance with one or more embodiments.

As discussed above, the inter-network facilitation system 104 can determine whether to approve or deny the dispute request based on the dispute-request values and the digital policy criteria. In accordance with one or more embodiments, FIG. 2 illustrates the digital inspection system 108 sending digital policy criteria to the digital service policy system 110. Furthermore, FIG. 2 also illustrates the digital inspection system 108 receiving a dispute request and sending the dispute request data to the digital service policy system 110 for deciding whether to approve or deny the dispute request. The following paragraphs describe the digital inspection system 108 sending digital policy criteria to the digital service policy system 110.

As just mentioned, the digital inspection system 108 optionally sends digital policy criteria 202. For example, the inter-network facilitation system 104 creates digital policy criteria 202 on the digital inspection system 108 for making decisions on disputed network transactions. The digital inspection system 108 can utilize the digital policy criteria 202 to render decisions. But in one or more example embodiments, the digital inspection system 108 sends the digital policy criteria 202 to the digital service policy system 110. In particular, the digital inspection system 108 uses the payload 204 that includes the digital policy criteria 202 and policy identifier(s) 206 to send the aforementioned elements to the digital service policy system 110. By receiving and implementing the digital policy criteria 202, the digital service policy system 110 can receive and process dispute requests that identify the digital policy criteria. To illustrate, the digital service policy system 110 receives the digital policy criteria 202 as entries in the payload 204 with the corresponding policy identifier(s) 206.

As further shown in FIG. 2, in some embodiments, the digital service policy system 110 stores the digital policy criteria 202. In some such embodiments, the digital service policy system 110 receives the digital policy criteria 202 via user inputs through a graphical user interface of an agent device (e.g., the agent device 202). As indicated above, in some embodiments, the digital policy criteria 202 are part of the payload 204 that can be sent by an agent device. Based on receiving the digital policy criteria 202 from the agent device and an associated digital policy, the digital service policy system 110 stores the digital policy criteria 202 along with the associated digital policy.

As mentioned, receiving or storing the digital policy criteria 202 via the digital service policy system 110 allows the inter-network facilitation system 104 to adjust the digital policy criteria 202 more flexibly and efficiently to create new, updated, changed, or artificially intelligent digital policy criteria. More details on the payload entries and digital policy criteria are given in FIG. 3 and adjusting, the digital policy criteria 202 is discussed in more detail in FIG. 5. The following paragraphs describe the implementation of digital policy criteria 202 into the digital service policy system 110, receiving dispute requests, and the subsequent approval or denial determination.

As discussed above, the digital service policy system 110 receives and implements the digital policy criteria 202. For example, the inter-network facilitation system 104 via the digital service policy system 110 can implement one or more additional digital policy criterion in response to receiving the payload 204. In particular, the additional digital policy criterion can include, for example, that the dispute request cannot have more than N transactions (number). To further illustrate, the digital service policy system 110 can determine values associated with the digital policy criteria 202, such as the number of transactions associated with the dispute request 216, the transaction threshold, or any other non-Boolean value. The digital inspection system 108 could determine the mentioned numeric values (rather than just determining Boolean values). But the digital service policy system 110 allows for more flexibility in adjusting digital policy criteria, applying thresholds, and utilizing machine learning models for generating machine learning predictions. Digital policy criterion and policy identifier(s) 206 are further discussed in FIG. 3, and utilizing machine learning models is further discussed in FIG. 5.

As is discussed in the previous paragraphs, the inter-network facilitation system 104 receives dispute requests. For instance, a client device 200 sends a dispute request 216 via the device application 201 to the inter-network facilitation system 104. For example, a user of the client device 200 indicates the dispute request 216 in a graphical user interface of the device application 201. In particular, the client device 200 selects one or more transactions associated with a user account to dispute and sends the dispute request 216 to the inter-network facilitation system 104. The inter-network facilitation system 104 receives information associated with the one or more transactions in the dispute request 216. More details on applying the digital policy criteria 202 to the dispute request data 208 are given in FIG. 3.

As further shown in FIG. 2, the inter-network facilitation system 104 uses the digital inspection system 108 as the initial receiver of the dispute request 216. For example, the digital inspection system 108 includes digital policy criteria 202 that can apply to the dispute request 216. In particular, the digital inspection system 108 can designate the digital policy criteria 202 as automation rules to apply to the incoming dispute request 216. To illustrate, the digital policy criteria 202 on the digital inspection system 108 can include requirements that a dispute request eligible for approval (1) not correspond to any pending transactions (Boolean value), (2) not have an additional dispute request associated with the dispute request (Boolean value), (3) not have any onsite-machine transactions (Boolean value), and (4) dispute an amount that satisfies (e.g., equals or falls below) a threshold number. To further illustrate, the digital inspection system 108 utilizes these digital policy criteria 202 to execute decisions on the dispute request 216. The digital inspection system 108 is further discussed in FIGS. 4 and 5.

To apply digital policy criteria 202 on the digital inspection system 108, in one or more example embodiments, the digital inspection system 108 determines whether to automatically approve the dispute request based on Boolean value instructions. In particular, as mentioned above, the instructions can include Boolean value determinations of whether the dispute request has pending transactions, has an onsite-machine fee transaction, and/or has linked disputes. To illustrate, the digital inspection system 108 can set these instructions to automatically calculate these Boolean values on the digital inspection system 108 in response to receiving the dispute request 216.

Furthermore, the digital inspection system 108 can then send these determined Boolean values to the digital service policy system 110. For example, the digital inspection system 108 includes the determined Boolean values in the dispute request data 208 sent to the digital service policy system 110. In particular, the dispute request data 208 includes dispute-request values 210 and policy identifier(s) 212. To illustrate, the digital service policy system 110 receives the dispute request data 208 with the Boolean values, dispute-request values 210, policy identifiers 212 and utilizes the aforementioned elements to identify relevant digital policy criteria 202. As previously discussed, the digital service policy system 110 is designed for flexibly implementing new, updated, changed, or artificially intelligent digital policy criteria 202.

As discussed, the digital inspection system 108 sends dispute request data 208 with dispute-request values 210 and policy identifier(s) 212 to the digital service policy system 110 for deciding whether to approve or deny the dispute request 216. For example, the digital service policy system 110 determines whether to approve or deny the dispute request 216 based on the dispute request data 208. In particular, based on the payload 204 and the dispute request data 208, the digital service policy system 110 performs an act 214 of determining whether to approve or deny the dispute request and sends the determination to the digital inspection system 108.

Figure 3:
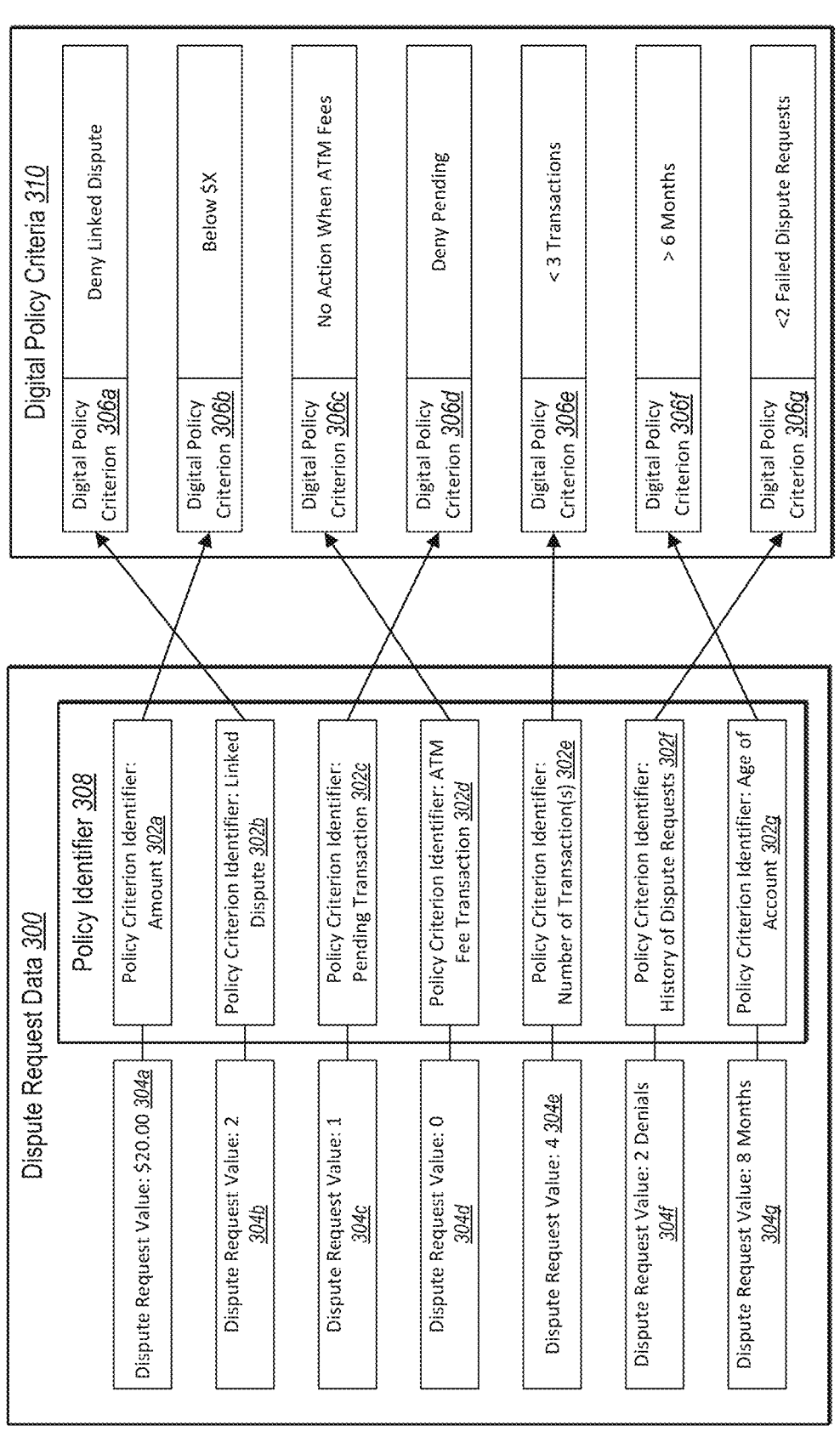
FIG. 3 illustrates an example diagram of the inter-network facilitation system mapping dispute-request values to policy criterion in accordance with one or more embodiments.

As discussed above, the inter-network facilitation system 104 maps dispute-request values to digital policy criteria. As shown, FIG. 3. illustrates the inter-network facilitation system 104 mapping dispute request values to digital policy criterion. Specifically, FIG. 3 illustrates the digital service policy system 110 receiving dispute request data 300 from the digital inspection system 108. The dispute request data 300 includes dispute request values 304a-304g each with a corresponding policy criterion identifier 302a-302g. The digital service policy system 110 maps dispute request values to individual digital policy criterion 306a-306g from digital policy criteria 310.

As discussed above, the inter-network facilitation system 104 sends, by the digital inspection system 108, to the digital service policy system 110 dispute request data 300. For example, the digital service policy system 110 receives the dispute request data 300 with multiple dispute-request values 304a-304g. In particular, the dispute-request values received by the digital service policy system 110 varies depending on the dispute request (e.g., dispute request 216 as discussed in FIG. 2). To illustrate, in some instances dispute-request values include an amount and exclude values such as a user account's past dispute history, or the age of the account.

In one or more example embodiments, the digital inspection system 108 passes the dispute request data 300 via a payload (e.g., payload 204 as discussed in FIG. 2). In particular, the digital inspection system 108 passes the dispute request data 300 via the payload from the digital inspection system 108 to the digital service policy system 110 with a defined schema in a protocol designed for cross-platform data structuring. To illustrate, the inter-network facilitation system 104 utilizes a protocol with compatible data formatting between the digital inspection system 108 and the digital service policy system 110. To further illustrate, a schema of the protocol definition for transferring digital policy criteria from the digital inspection system 108 to the digital service policy system 110 is represented by the following pseudocode in Table 1 below:

```
package internetworkfacilitation-system.realtimedecisioning.event.v1;
// Digital Inspection System-Digital Service Policy system
payload for auto-decisioning disputes
message InspectionSystemAutoDecisionDisputeEvent {
    bool pending_transactions_exist = 1;
    bool has_atm_fee_transactions = 2;
    google.type.Money amount = 3;
    int64 transaction_count = 4;
    string user_id = 5;
    string dispute_id = 6;
    google.protobuf.Timestamp dispute_timestamp = 7;
    google.type.Money dispute_amount = 8;
    int64 dispute_transaction_count = 9;
    int64 dispute_pending_transactions_count = 10;
    int64 dispute_atm_fee_transactions_count = 11;
    string dispute_type = 12;
    repeated chime.realtimedecisioning.model.v1.
    DisputedTransaction transactions = 13;
    int64 dispute_oldest_transaction_age = 14;
}
```

In some embodiments, the inter-network facilitation system 104 repeats real-time decision making for disputed transactions (indicted by "13" in Table 1 above) by the following pseudocode in Table 2 below:

```
package internetworkfacilitation-system.realtimedecisioning.event.v1;
// Digital Inspection System - Digital Service Policy system
payload for auto-decisioning disputes
message DisputedTransaction {
    google.protobuf.Timestamp transaction_timestamp = 2;
    google.type.Money transaction_amount = 3;
    bool card_present = 4;
    string merchant_name = 5;
    string entry_type = 6;
}
```

Moreover, in one or more example embodiments, the inter-network facilitation system 104 utilizes a transaction count digital policy criterion (as shown in the pseudocode above) on the digital service policy system 110. In particular, the digital service policy system 110 utilizes the transaction count because the inter-network facilitation system 104 conserves computational processing power by not automating dispute requests with a large number of transactions. Accordingly, the inter-network facilitation system 104 can establish a threshold for the transaction count.

As indicated by FIG. 3, the inter-network facilitation system 104 can associate multiple dispute-request values 304a-304g with a single policy identifier 308 and as a subset of the policy identifier 308, each dispute request value 304a-304g can include a policy criterion identifier 302a-302g. For example, the inter-network facilitation system 104 matches dispute request values with policy criterion identifiers based on a classification of the dispute request values. To illustrate, if the dispute request value is a monetary amount, the inter-network facilitation system 104 classifies that as an amount. Accordingly, the inter-network facilitation system 104 appends the policy criterion identifier of amount to the monetary amount dispute request value.

Likewise, as discussed above with policy identifiers and policy criterion identifiers, the digital policy criteria 310 can include a subset of multiple digital policy criterion 306a-306g that maps to the dispute request values. In particular, the digital service policy system 110 maps the dispute-request values 304a-304g to the digital policy criterion

306a-306g based on metadata information containing the policy criterion identifiers 302a-302g.

As discussed above, the inter-network facilitation system 104 maps each of the dispute-request values 304a-304g to a respective digital policy criterion 306a-306g based on the policy criterion identifiers 302a-302g. In one or more implementations, the inter-network facilitation system 104 can intelligently adjust the digital policy criterion 306a-306g. For example, as indicated by FIG. 3, the inter-network facilitation system 104 can change a policy identifier or individual policy criterion identifiers in the dispute request data 300 to map to and execute different digital policy criteria.

As just discussed, FIG. 3 illustrates the inter-network facilitation system 104 mapping of dispute-request values 304a-304g to digital policy criterion 306a-306g. For example, the policy criterion identifier 302a-302g points to a digital policy criterion 306a-306g. In particular, policy criterion identifier 302a points to digital policy criterion 306b because the digital policy criterion 306b relates to the amount of the dispute request. To illustrate, the digital policy criterion 306b instructs the digital service policy system 110 to determine whether the dispute request value 304a ($20.00) is below $X. Digital policy criterion 306b, in this instance, represents a transaction threshold for the dispute request.

As further shown in FIG. 3, the dispute request values 304a-604g can be customized to a particular digital policy criterion and corresponding policy criterion identifiers. For example, FIG. 3 shows seven dispute request values mapping to seven digital policy criterions. The following are the dispute-request values and corresponding policy criterion identifiers shown in FIG. 3: (1) a dispute request value 304a with a value of $20.00 and a policy criterion identifier 302a for identifying an amount. The policy criterion identifier 302a identifies a monetary value associated with the dispute request. (2) A dispute request value 304b with a value of 2 and a policy criterion identifier 302b for identifying or enumerating linked disputes. The policy criterion identifier 302b identifies whether the current dispute request is disputed in any prior dispute requests. (3) A dispute request value 304c with a value of 1 and a policy criterion identifier 302c for identifying or enumerating pending transactions. The policy criterion identifier 302c identifies whether the current dispute request contains a pending transaction. (4) a dispute request value 304d with a value of 0 and a policy criterion identifier 302d for identifying or enumerating on-site machine transaction. The policy criterion identifier 302d identifies whether the current dispute request contains a transaction associated with an on-site machine transaction. (5) A dispute request value 304e with a value of 4 and a policy criterion identifier 302e for identifying or enumerating a number of transaction(s). The policy criterion identifier 302e identifies within the current dispute request the number of transactions included. (6) A dispute request value 304f with a value of 2 denials and a policy criterion identifier 302f for identifying or enumerating history of dispute requests 302f. The policy criterion identifier 302f identifies the past results of dispute requests filed by the user account associated with the current dispute request. (7) A dispute request value 304g with a value of 8 months and a policy criterion identifier 302g for identifying or enumerating an age of account. The policy criterion identifier 302g identifies an age of the user account associated with the current dispute request.

In some embodiments, the inter-network facilitation system 104 includes dispute-request values for digital policy criteria that (when not satisfied) automatically triggers the digital service policy system 110 to deny a dispute request. Based on digital policy criterion identifiers 302b, 302c, and 302d, for example, the digital service policy system 110 maps the dispute-request values 304b, 304c, and 304d to digital policy criterion 306a, 306d, and 306c, respectively. In some cases, the digital service policy system 110 categorically denies a dispute request when the dispute-request values 304b and 304c do not satisfy the digital policy criteria 306a and 306d, respectively. In particular, if the digital service policy system 110 determines that the dispute request data 300 indicates one of a pending transaction or a linked dispute, then the digital service policy system 110 determines to deny the dispute request. Further, in some cases, the digital service policy system 110 performs no action on a dispute request when the dispute-request value 304d does not satisfy the digital policy criteria 306c. In particular, if the digital service policy system 110 determines that the dispute request data 300 indicates an on-site machine transaction, the digital service policy system 110 determines to perform no action on the dispute request and send the dispute request to a queue for agent processing.

By contrast, for digital policy criterion, such as digital policy criterion 306a-306g, the digital service policy system 110 can use a threshold for the digital policy criteria 310 to determine whether to deny a dispute request. For example, using a threshold for the digital policy criteria 310 includes determining whether the received dispute-request values satisfy a threshold for the digital policy criteria 310. If so, then the digital service policy system 110 approves the dispute request. In particular, FIG. 3 illustrates using thresholds for individual digital policy criterion. The digital service policy system 110 for digital policy criterion 306e has set the number of transactions in the dispute request as <3. For digital policy criterion 306g, the digital service policy system 110 has set the threshold to <2 failed dispute requests. For the digital policy criterion 306f, the digital service policy system 110 has set the threshold to >6 months for age of account. To further illustrate, as an example, the digital service policy system 110 establishes a threshold that identifies the number of prior failed dispute requests and denies the current dispute request if the threshold is not satisfied. In particular, if the threshold set by the digital service policy system 110 for failed dispute requests is <2, and the current dispute request data 300 indicates that the user account previously failed two dispute requests, the digital service policy system 110 determines to deny the current dispute request.

In one or more implementations, the inter-network facilitation system 104 via the digital service policy system 110 can apply operations to the dispute-request values 304a-304g. In particular, the inter-network facilitation system 104 can use equality operations, greater than operations, or less than operations. To illustrate, the digital service policy system 110 can designate the digital policy criterion 306f as 6 months, and the digital service policy system 110 can apply an equality operation to an incoming dispute request value associated with digital policy criterion 306f. Thus, the digital service policy system 110 determines whether the dispute request value associated with digital policy criterion 306f is equal to 6 months. The digital service policy system 110 can designate any of the digital policy criterion to apply one of the aforementioned operations to the dispute-request values 304a-304g.

Figure 4:
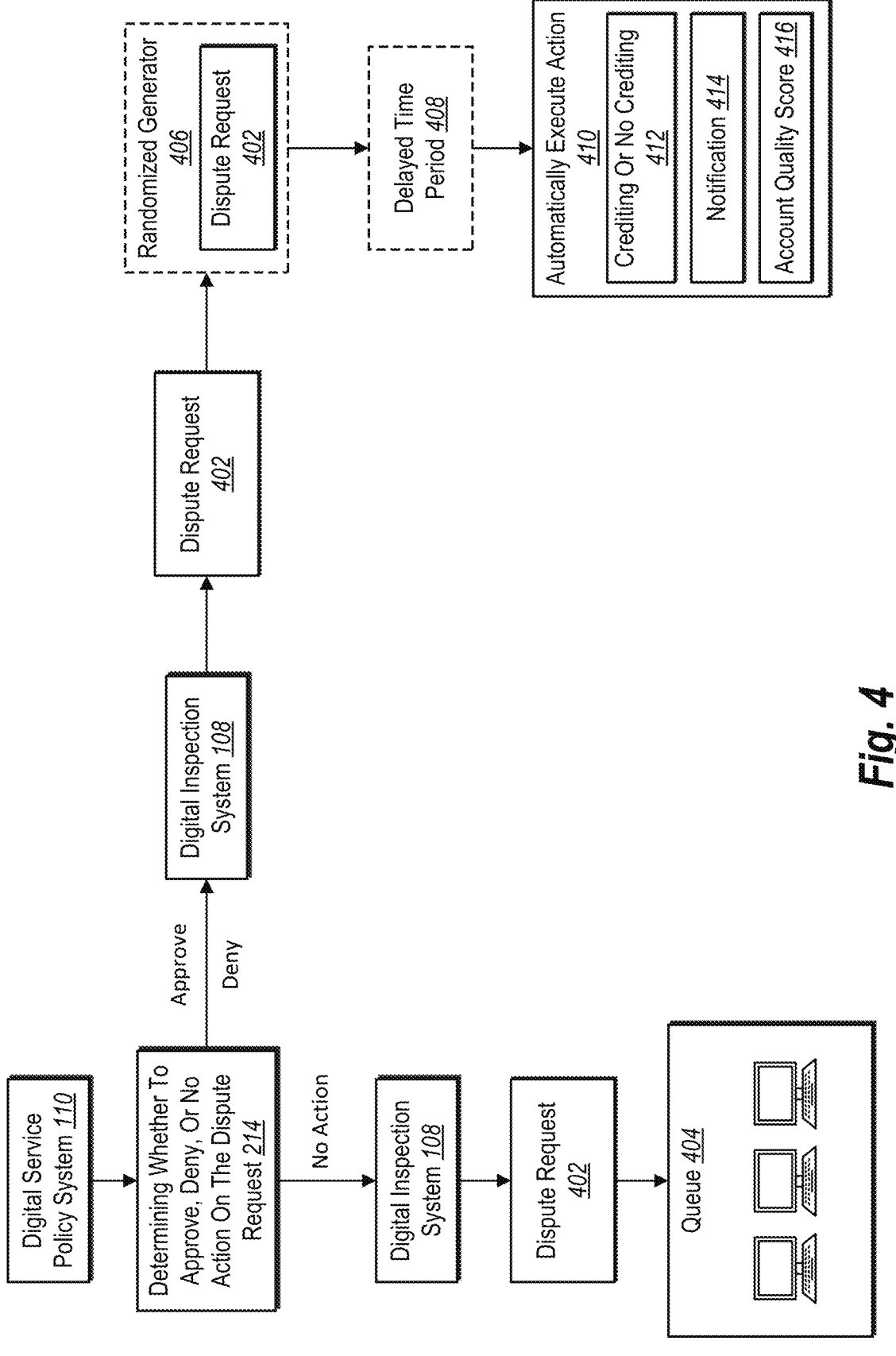
FIG. 4 illustrates an example diagram of a process flow of the inter-network facilitation system in response to an approval or denial in accordance with one or more embodiments.

As discussed above, the inter-network facilitation system 104 via the digital service policy system 110 determines whether to approve or deny the dispute request or perform no action on the dispute request. As shown, FIG. 4 illustrates the inter-network facilitation system 104 determining whether to approve or deny a dispute request and sending an indicator of the approval or denial determination from the digital service policy system 110 to the digital inspection system 108. As shown in FIG. 4, the digital inspection system 108 either automatically executes an action in response to the dispute request (upon approval or denial) or relays the dispute request to an agent queue (upon no action).

As just mentioned, the inter-network facilitation system 104 via the digital service policy system 110 makes approval or denial determinations. For example, the digital service policy system 110 can send a method call via an API endpoint to a subroutine of the digital service policy system 110 for determining whether to approve the dispute request. In particular, the digital service policy system 110 determines whether the digital policy criteria (e.g., digital policy criteria 310 as discussed in FIG. 3) associated with auto decisioning of dispute requests is satisfied.

To illustrate, after the digital service policy system 110 sends a method call of whether to approve or deny, the digital service policy system 110 receives, for example, the following pseudocode response from the subroutine of the digital service policy system 110 for determining whether to approve the dispute request, as set forth in Table 3 below:

```
def auto_decisionable?
attrs = {
has_pending_transactions: . . . ,
has_atm_fee_transactions: . . . ,
has_referring_disbute: . . . ,
amount: . . . ,
transaction_count: . . .
}
event = Inter-
networkFacilitationSystem::Realtimedecisioning::
V1::DigitalInspectionAutoDecisionDispute
Event.new(attrs)
decision = DecisionClient::Risk.decision(event) do |response|
DecisionClient::Risk::Decision::DENY
end
decision.allow?
end
}
```

In the above response, the digital service policy system 110 identifies the specified digital policy criteria (as attributes) of the dispute request 402 and uses the automated (real time) decisioning method call to determine to deny the dispute request 402. In particular, the digital service policy system 110 determines to deny the dispute request 402 based on a lack of satisfaction for the digital policy criteria or based on other restrictions. Other restrictions can include not allowing a user account associated with a client device to file, for example, more than 3 dispute requests within a threshold time period (e.g., 1 year). In other embodiments, however, the response indicates that the digital service policy system 110 approved the dispute request. The following paragraphs describe embodiments in which the digital inspection system 108 (i) receives an indication of a denial for a dispute request 402 and executes certain corresponding actions, (ii) receives an indication of an approval for the dispute request 402 and executes certain corresponding actions, or (iii) receives an indication of no action for the dispute request 402 and relays the dispute request to a queue 404.

As discussed above, in some embodiments, the digital service policy system 110 sends an indication of a denial determination to the digital inspection system 108. In particular, in response to receiving a denial from the digital service policy system 110, in some cases, the digital inspection system 108 sets an automation flag for dispute resolution to TRUE.

The digital service policy system 110 can deny a dispute request based on a dispute request's failure to satisfy various digital policy criteria. To illustrate, the digital service policy system 110 can deny the dispute request 402 based on the presence of a pending transaction within the dispute request 402. In this instance, the digital inspection system 108 does not assign the dispute request 402 to an agent device (e.g., agent device 120 as discussed in FIG. 1) because the dispute request 402 contains a pending transaction. In response to the denial, the digital inspection system 108 can send a notification to the client device associated with the dispute request to refile the dispute request 402 when the transaction is no longer pending. For instance, the digital inspection system 108 can send an email, text, or device application notification.

In addition to denying a dispute request for a pending transaction, in one or more implementations, the digital service policy system 110 denies the dispute request 402 because it fails to satisfy a threshold for another digital policy criteria. In particular, the digital service policy system 110 may have determined to deny the dispute request based on a transaction threshold not being satisfied. In some such circumstances, the digital inspection system 108 receives a denial and (in response) sends a request to the inter-network facilitation system 104 to process the dispute request 402 via a dispute-evaluator machine-learning model. For example, the digital service policy system 110 may use a dispute-evaluator machine-learning model described by U.S. patent application Ser. No. 17/664,776 (filed May 24, 2022), which is hereby incorporated by reference in its entirety.

As further indicated by FIG. 4, the digital inspection system 108 can either delay executing an action corresponding to a denied dispute request or promptly execute such an action without a delay. In one or more implementations, the digital inspection system 108 utilizes a randomized generator 406 to determine a time period for delay to execute an action. In particular, the randomized generator 406 selects a time period for performing an act 410 of automatically executing an action. To illustrate, the digital inspection system 108 receives an approval request and utilizes the randomized generator 406 to generate a delayed time period 408, such as a number of hours or days. Having generated the delayed time period 408 as 3 days, for instance, the digital inspection system 108 would wait 3 days before performing the act 410. Utilization of the randomized generator 406 improves the security of the inter-network facilitation system 104 by masking types of dispute requests that qualify for automated approval from fraudsters or serial dispute requestors.

After the digital inspection system 108 receives a denial determination, regardless of the delayed time period 408 or no delayed time period, the digital inspection system 108 can perform the act 410 of automatically executing an action. As shown in FIG. 4, the action can include at least one of crediting or no crediting 412 the user account (e.g., no crediting for a denial determination); sending a notification 414 (e.g., via email, text, or device application relating to the denial); or generating an account quality score 416 (e.g., an account quality score that is relatively lower than before because of the denial). In some embodiments, the digital inspection system 108 determines one or more of the aforementioned actions to execute based on a denial determination. In contrast to receiving an indication of a denial determination, the digital inspection system 108 can receive a determination to approve the dispute request 402. To illustrate, the digital inspection system 108 receives the approval determination and the digital inspection system 108 sets an automation flag for dispute resolution to TRUE. As indicated above, the approval determination can come in the form of a pseudocode response outlined in Table 3.

As indicated by FIG. 4, the digital inspection system 108 can either delay executing an action corresponding to an approved dispute request or promptly execute such an action without a delay. In one or more implementations, the digital inspection system 108 utilizes the randomized generator 406 to determine a time period for delay to execute an action, as described above.

After the digital inspection system 108 receives an approval determination, regardless of the delayed time period 408 or no delayed time period, the digital inspection system 108 can perform an act 410 of automatically executing an action. As shown in FIG. 4, the action can include at least one of crediting or no crediting 412 the user account (e.g., crediting for an approval determination); sending a notification 414 (e.g., via email, text, or device application relating to the approval); or generating an account quality score 416 (e.g., an account quality score that is relatively higher than before because of the approval). In some embodiments, the digital inspection system 108 determines one or more of the aforementioned actions to execute based on an approval determination.

To illustrate automatically executing an action, crediting includes the digital inspection system 108 restoring monetary value to a user account associated with the dispute request. For example, if the dispute request involved $35.00, the digital inspection system 108 credits $35.00 to the user account of the dispute request. In addition to crediting, the digital inspection system 108 can also send the notification 414 to the user account associated with the dispute request. To illustrate, the digital inspection system 108 could send an email, text, or in-app notification that the user account has been credited with $35.00.

In addition to crediting and notification, the digital inspection system 108 can also determine or adjust the account quality score 416 when automatically executing an action. The account quality score 416 includes a score associated with a user account indicating behavior, such as the success of dispute requests, the presence of fraudulent activity, the age of the account, and the history of transactions. In particular, a relatively higher account quality score can indicate past successful dispute requests, the user account does not have fraudulent activity, or the age of the user account is relatively older. Conversely, a relatively lower account quality score can indicate past unsuccessful dispute requests, the user account does exhibits fraudulent activity, or the age of the user account is relatively newer. To illustrate, the digital inspection system 108 approving the current dispute request can cause the account quality score 416 to increase by X points. In future decisions, the digital inspection system 108 or the inter-network facilitation system 104 can utilize the account quality score 416 to determine whether actions such as provisional credit or final credit is appropriate for a user account.

As further indicated by FIG. 4, in some cases, digital inspection system 108 receives an indication of no action for the dispute request 402 and relays the dispute request to a queue 404. In contrast to successfully determining whether to approve or deny a dispute request, in some cases, the inter-network facilitation system 104 can identify for the dispute request 402 when the digital service policy system 108 fails to render an approval or denial determination.

As indicated by FIG. 4, the inter-network facilitation system 104 diverts the dispute request 402 from the digital service policy system 110 to the queue 404. As shown in FIG. 4, the queue 404 includes a list of additional dispute requests waiting for manual processing or review by one or more agent devices. Indeed, in some cases, agents associated with agent devices in the queue 404 resolve the dispute request 402.

In addition or in the alternative to manual processing, in some embodiments, the digital inspection system 108 can apply its own digital policy criteria to determine whether to automatically approve or deny a dispute request. In particular, the digital inspection system 108 after applying digital policy criteria can set the automation flag for dispute resolution to TRUE or FALSE. Setting the automation flag to TRUE or FALSE results in performing one of the aforementioned actions (crediting 412, notification 414, account quality score 416, etc.).

As discussed above, the digital service policy system 110 can select one or more machine learning models from a plurality of machine learning models. As shown, FIG. 5 illustrates the digital service policy system 110 selecting a first machine learning model 504 and a second machine learning model 506—according to one or more digital policy criteria—to generate a first machine learning prediction 510 and a second machine learning prediction 512.

Figure 5:
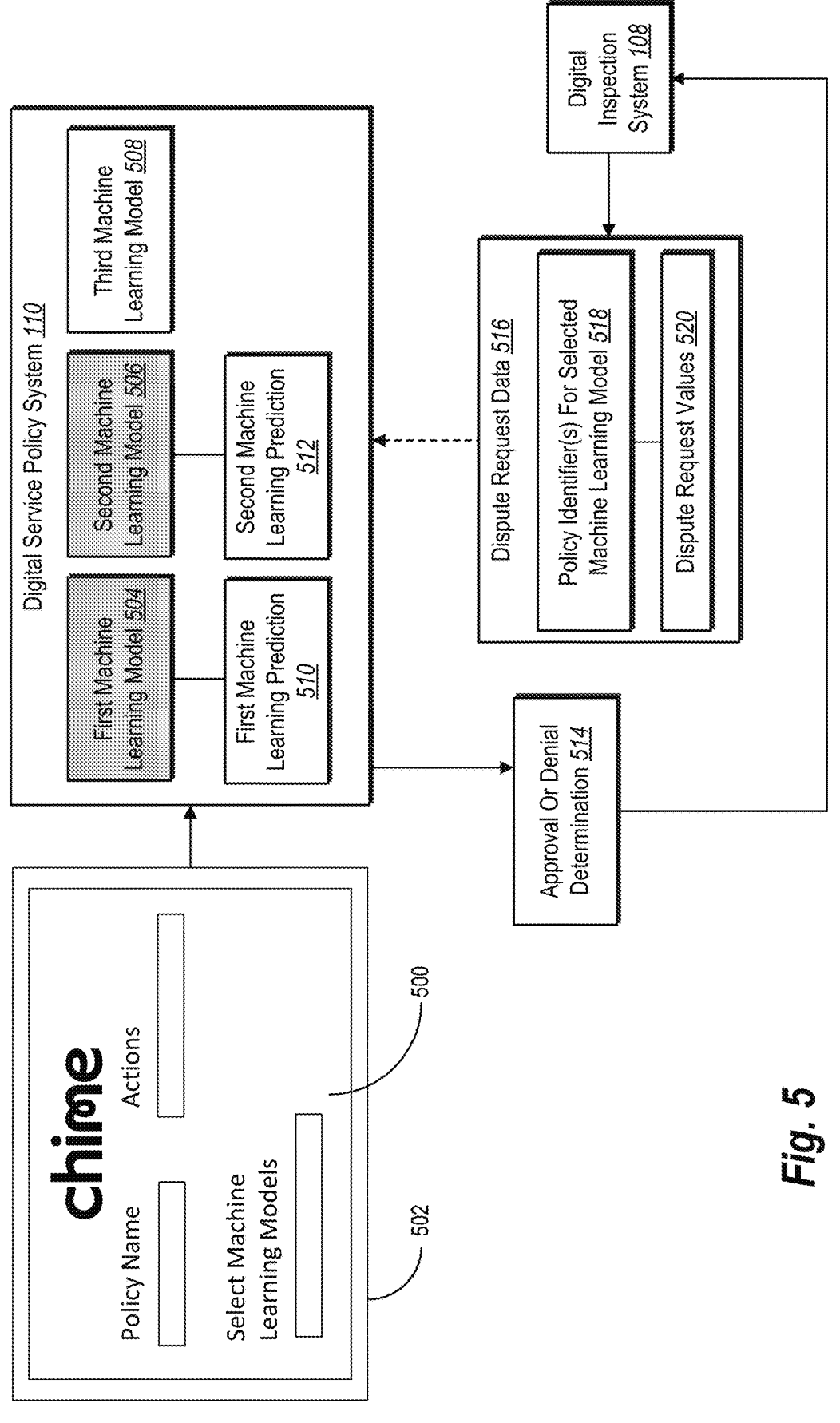
FIG. 5 illustrates an example diagram of the inter-network facilitation system selecting one or more machine learning models according to one or more digital policy criteria in accordance with one or more embodiments.

Specifically, FIG. 5 illustrates a graphical user interface 500 of a device 502 for selecting a machine learning model according to a digital policy criterion. In response to a user of the device 502 filling in the graphical user interface 500, the digital service policy system 110 inputs digital policy criteria that select or apply the selected machine learning models. The following paragraphs discuss the digital service policy system receiving input such as digital policy criteria/ machine learning models, and examples of the functions performed by machine learning models.

As mentioned above, the device 502 allows for a user of the device 502 to select a machine learning model associated with a digital policy criterion from the digital policy criteria. For example, the device 502 may display the graphical user interface(s) shown and described by U.S. patent application Ser. No. 17/663,277 (filed May 13, 2022), which is hereby incorporated by reference in its entirety. In particular, the user of the device 502, can select the policy name, actions to be performed, and a machine learning model. To illustrate, the device 502 via the graphical user interface 500 provides a flexible way to apply model-based adjustments to the digital policy criteria within the digital service policy system 110. Specifically, certain digital policy criteria (or criterion) can be associated with certain machine learning models. Thus, selecting digital policy criteria (or criterion) to implement to dispute request data 516 can optionally activate the use of a machine learning model to generate a machine learning prediction(s). For instance, the machine learning models identified or selected by digital policy criteria can include, but are not limited to, (1) a dispute-evaluator machine-learning model, (2) a likelihood-of-fraud machine-learning model, and (3) a user-account-quality machine-learning model.

In one or more implementations, digital policy criteria (or criterion) associated with a dispute-evaluator machine-learning model can utilize incoming data from a user account associated with a dispute request. For example, the dispute-evaluator machine-learning model generates a score based on the dispute request and other data associated with a user account. As another example, the digital service policy system 110 can receive input to implement a dispute-evaluator machine-learning model associated with a transaction threshold. To illustrate, if the dispute-evaluator machine-learning model generates a 0.52 score, then there is a 52% chance of the dispute request being approved. This is further discussed below.

In one or more implementations, digital policy criteria associated with a likelihood-of-fraud machine-learning model can also utilize incoming data from a user account associated with a dispute request. For example, the likelihood-of-fraud machine-learning model generates a score indicating a level of suspiciousness associated with the dispute request. To illustrate, if the likelihood-of-fraud machine-learning model generates a score of 0.20, there is a 20% chance of the dispute request being fraudulent. As opposed to the dispute-evaluator machine-learning model, the likelihood-of-fraud machine-learning model is looking for specific indicators of account age, amount, location, and dispute patterns that may indicate a bad actor. Whereas the dispute-evaluator machine-learning model is broadly looking at the possibility of a dispute request being approved. The likelihood-of-fraud machine-learning model is further discussed below.

In one or more implementations, digital policy criteria associated with a user-account-quality machine-learning model can also utilize incoming data from a user account associated with a dispute request. For example, the user-account-quality machine-learning model generates a score that indicates composite behavioral patterns of the user account. Account quality scores were previously discussed in relation to FIG. 4. The user-account-quality machine-learning model utilizes dispute request data along with past user account data to generate a score. To illustrate, the user-account-quality machine-learning model can generate a score of 0.90 which indicates that the user account has been open for more than 6 months and has had no suspicious activity on the account.

Furthermore, as mentioned above, the user of the device 502 can also select an action to be performed. For example, an action to be performed can include the user of the device 502 sending instructions to the digital service policy system 110 regarding the digital policy criteria (criterion) and machine learning models. In particular, the action to be performed can include specifying a number of days to implement dispute request data 516 into a machine learning model. Or the action to be performed can include a time period to delay applying a machine learning model. To illustrate, the action to be performed could specify that the selected machine learning model applies to the selected digital policy criteria (or criterion) for 2 weeks.

In one or more implementations, the digital service policy system 110 provides a low-risk method of testing digital policy integration. In particular, the inter-network facilitation system 104 can use the digital service policy system 110 as a developer platform for targeted focus groups to analyze bugs within digital policy criteria. Using the digital service policy system 110 rather than a system, such as the digital inspection system 108, has advantages, such as flexibly and efficiently adjusting digital policy criteria without employing a large amount of computational processing power. Flexible and efficient adjustment of digital policy criteria can be accomplished via graphical user interface 500 of the device 502. Moreover, when implementing digital policy criteria on the digital service policy system 110, the inter-network facilitation system 104 further improves the network security by providing for optimization of digital policies to reduce fraudulent activity.

The following paragraphs discuss the digital service policy system 110 receiving payloads with policy identifier(s) and/or dispute request data 516. Following those paragraphs, the discussion transitions to the execution of machine learning models on the digital service policy system 110 based on the policy identifier(s) to generate machine learning predictions.

As discussed above, the digital service policy system 110 can receive a payload with policy identifier(s). Receiving payloads with policy identifier(s) was previously discussed in FIG. 2. In one or more example embodiments, the digital service policy system 110 receives payloads with policy identifier(s) for digital policy criteria (or criterion) in response to the aforementioned selection of digital policy criteria (criterion) and machine learning model(s) by a user of the device 502. In particular, the digital service policy system 110, receives the payload with policy identifier(s) for the selected digital policy criteria (or criterion) from the digital inspection system 108 without receiving dispute request data 516.

As further shown in FIG. 5, the digital service policy system 110 can optionally receive the policy identifier(s) for digital policy criteria (or criterion) with the dispute request data 516 rather than receiving it separately as discussed in the last paragraph. After the digital service policy system 110 receives a payload comprising a digital policy identifying machine learning models, the digital inspection system 108 sends a payload with dispute request data 516 containing dispute-request values 520 and policy identifier(s) 518 corresponding to the selected machine learning models.

As just mentioned, the digital service policy system 110 can optionally receive policy identifier(s) together or separate from the dispute request data 516. In one or more implementations, in response to selecting digital policy criteria (or digital policy criterion) that engage with machine learning model(s), the digital service policy system 110 can send instructions to the digital inspection system 108 for payloads with policy identifier(s) 518 that correspond with the selected machine learning model(s). For example, in response to the digital service policy system 110 utilizing a likelihood-of-fraud machine-learning model, the request can include payloads with policy identifier(s) 518 for user account dispute request history, amount of dispute request, or age of account. The digital service policy system 110 can use these tailored payloads to establish threshold scores for different digital policy criteria and to generate machine learning predictions.

In another example embodiment, in response to the digital service policy system 110 utilizing a dispute-evaluator machine-learning model, the request to the digital inspection system 108 includes different policy identifier(s) than the likelihood-of-fraud machine-learning model. In particular, the request can include payloads with policy identifier(s) 518 for dispute request amount, linked disputes, pending transactions, and the number of transactions within the dispute request. Specifically, the requests sent from the digital service policy system 110 to the digital inspection system 108 for policy identifier(s) tailors the data received for implementing the selected machine learning model(s).

In addition to the digital service policy system 110 receiving payloads with the policy identifier(s) 518 and the dispute request values 520, the digital service policy system 110 can select more than one machine learning model to apply to the dispute request values 520. For example, a user of the device 502 can select the digital policy criteria relating to likelihood of approval and likelihood of fraud. In particular, this would enable the digital service policy system 110 to generate machine learning predictions relating to the likelihood of fraud for automatic approval of the dispute request and the likelihood of approval. Similar to the above discussion, in some embodiments, the digital service policy system 110 utilizes machine learning principles to generate machine learning predictions and request payloads with specific policy identifier(s) for the selected machine learning models. As illustrated in FIG. 5, the digital service policy system 110 utilizes a selected first machine learning model 504 and a selected second machine learning model 506. The digital service policy system 110 does not select a third machine learning model 508.

As mentioned above, the machine learning models generate machine learning predictions. For example, based on the received dispute request data 516, the digital service policy system 110 generates the first machine learning prediction 510 and the second machine learning prediction 512. In particular, a machine learning prediction relating to first-party fraud could include a 0.49 score. In particular, the likelihood-of-fraud machine-learning model generates this score in response to receiving dispute request data 516. To illustrate, the digital service policy system 110 can determine that the threshold for a first-party fraud score must be below 0.50. As such, a machine learning prediction of 0.49 can still qualify for automated dispute request approval because it is below the 0.50 threshold.

As mentioned above, the machine learning models generate predictions for dispute requests. For example, the dispute-evaluator machine-learning model can determine a likelihood of approval prediction for a dispute request. To illustrate, the inter-network facilitation system 104 via the dispute-evaluator machine-learning model can encode past dispute request data, such as past transaction amounts and results of the dispute requests, received by the inter-network facilitation system 104 via the digital inspection system 108 (e.g., using one hot encoding, an encoding layer, or a vector mapping) and then process the encoding utilizing the machine learning model to determine a likelihood of approval based on past results.

Furthermore, the inter-network facilitation system 104 can utilize a variety of machine learning models to analyze dispute request data and make machine learning predictions for dispute requests. For example, the machine learning models can analyze past transaction amounts and other information associated with dispute requests. In one embodiment, for instance, the machine learning model is a decision tree, such as a random forest model or a boosted gradient decision tree. Accordingly, the inter-network facilitation system 104 feeds, for example, the past dispute request results and/or the information associated with dispute requests to input channels of the random forest model. The random forest model then utilizes learned nodes within one or more decision trees to generate the likelihood of approval score (a machine learning prediction).

In other implementations, the inter-network facilitation system 104 can utilize a neural network, such as a convolutional neural network, or other machine learning model to process the dispute request results and/or the information associated with dispute requests. This allows for the digital service policy system 110 to make intelligent determinations regarding the machine learning predictions for automatic approval of dispute requests. For example, in response to pervasive fraudulent activity throughout the inter-network facilitation system 104, the inter-network facilitation system 104 can determine to suspend automatic approvals.

In one or more example embodiments, the digital service policy system 110 can utilize more than one machine learning model and generate more than one machine learning prediction. In particular, the digital service policy system can use a likelihood-of-fraud machine-learning model and a dispute-evaluator machine-learning model. To illustrate, the digital service policy system 110 can take a combination of the two score and perform the act 514 of determining to approve or deny the dispute request. A combination of the two scores can include an average, a ratio, or a total score. For example, if the first machine learning prediction 510 involves a score of 0.49 and the second machine learning prediction 512 involves a score of 0.75, the digital service policy system 110 can average 0.49 and 0.75 to generate a combined score of 0.62. Moreover, the digital service policy system 110 can intelligently determine how to utilize multiple scores for performing the act 514.

As also mentioned above, the digital service policy system 110 utilizes the generated machine learning predictions to decide whether to approve or deny a dispute request. For example, the digital service policy system 110 performs an act 514 of making an approval or denial determination. In particular, with the last machine learning prediction example, if the generated score is 0.62, the digital service policy system can determine to deny automatic approval because the requirement for approval is 0.75. Furthermore, in response to the digital service policy system 110 making an approval or denial determination, the digital inspection system 108 receives the decision. This was previously discussed in FIG. 4.

Although FIG. 5 shows the selection of machine learning model(s) to make approval or denial determinations, the inter-network facilitation system 104 can use the digital service policy system 110 and machine learning model(s) for a variety of purposes. In one or more implementations, the inter-network facilitation system can audit the machine learning predictions from the digital service policy system 110. In particular, the inter-network facilitation system 104 can determine how the digital inspection system 108 would decide and compare that to determinations by the digital service policy system 110 via the machine learning model(s).

Figure 6:
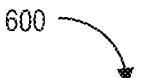
FIG. 6 illustrates an example series of acts for relaying a payload comprising digital policy criteria from a first digital system to a second digital system to automatically implement the digital policy criteria for a dispute request and determine whether to approve or deny the dispute request in accordance with one or more embodiments.
Figure 6:
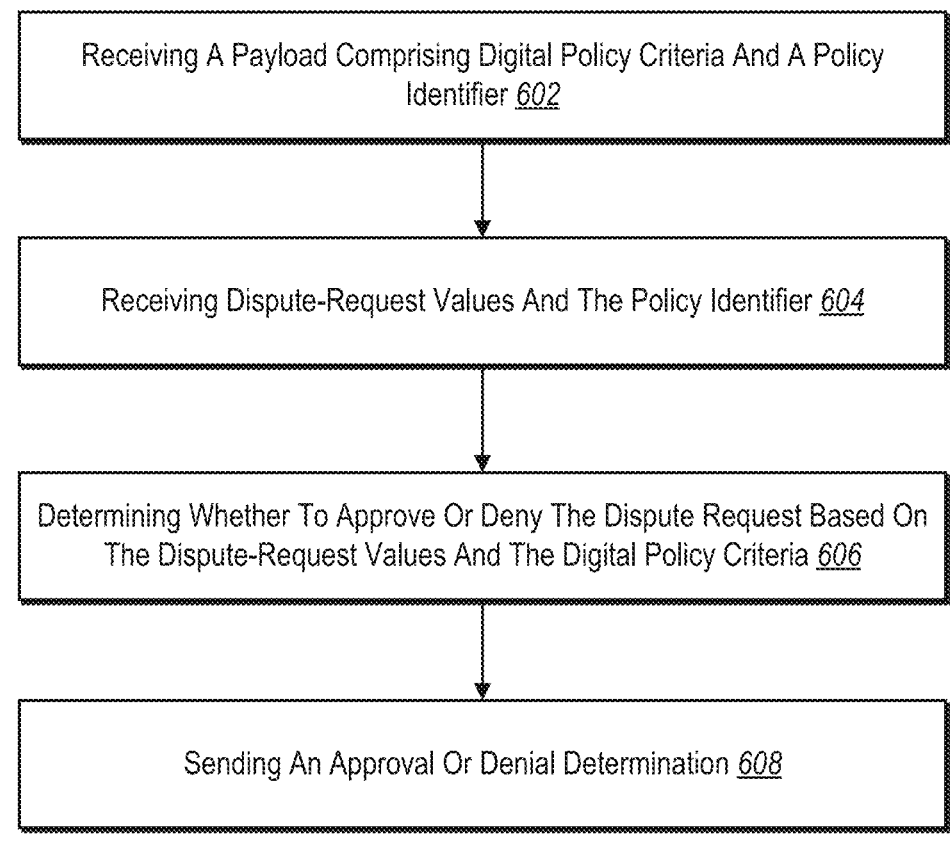

FIGS. 1-5, the corresponding text, and the examples provide a number of different methods, systems, devices, and non-transitory computer-readable media of the inter-network facilitation system 104. In addition to the foregoing, one or more embodiments can also be described in terms of flowcharts comprising acts for accomplishing a particular result, as shown in FIG. 6. FIG. 6 may be performed with more or fewer acts. Further, the acts may be performed in differing orders. Additionally, the acts described herein may be repeated or performed in parallel with one another or parallel with different instances of the same or similar acts.

FIG. 6 illustrates an example series of acts 600 for determining whether to approve or deny a dispute request via the inter-network facilitation system 104. The series of acts 600 can include an act 602 of receiving a payload comprising digital policy criteria and a policy identifier. For example, this includes receiving, from a first digital system, a payload comprising digital policy criteria and a policy identifier for at least one of the digital policy criteria. Further, the act 602 can include receiving the payload comprising a digital policy criterion and a policy criterion identifier for the digital policy criterion.

Moreover, the act 602 can include receiving, from the first digital system, an additional payload comprising additional digital policy criteria differing from the digital policy criteria and an additional policy identifier for at least one of the additional digital policy criteria, receiving, from the first digital system, additional dispute-request values corresponding to an additional dispute request for an additional network transaction and the additional policy identifier, determining, by a second digital system, whether to approve or deny the additional dispute request based on the additional dispute-request values and the additional digital policy criteria, and sending an approval or denial determination for the additional dispute request to the first digital system.

As shown, the series of acts 600 can also include an act 604 of receiving dispute-request values and the policy identifier. For example, this includes receiving, from the first digital system, dispute-request values corresponding to a dispute request for a network transaction and the policy identifier. Further, the act 604 can include identifying one or more pending network transactions corresponding with the dispute request. In particular, the act 604 can include at least one of identifying one or more additional dispute requests associated with the dispute request, identifying one or more onsite-machine transactions corresponding with the dispute request, identifying whether one or more network transactions associated with the dispute request satisfies a transaction threshold, or identifying a number of transactions corresponding to the dispute request.

As shown, the series of acts 600 can include an act 606 for determining whether to approve or deny the dispute request based on the dispute-request values and the digital policy criteria. For example, this includes determining, by a second digital system, whether to approve or deny the dispute request based on the dispute-request values and the digital policy criteria. Additionally, the act 606 includes mapping, by the second digital system, the dispute-request values to the digital policy criteria and determining whether to approve or deny the dispute request based on the mapped dispute-request values.

Further, the act 606 also includes generating a score from the dispute-request values and determining whether to approve or deny the dispute request based on the generated score satisfying or not satisfying a scoring threshold. In addition, the act 606 includes selecting, by the second digital system, a machine learning model from a plurality of machine learning models according to a digital policy criterion from the digital policy criteria, utilizing the machine learning model to generate a machine learning prediction and determining whether to approve or deny the dispute request based further on the machine learning prediction.

Moreover, the act 606 includes selecting, by the second digital system, a first machine learning model and a second machine learning model from a plurality of machine learning models respectively according to a first digital policy criterion and a second digital policy criterion from the digital policy criteria, utilizing the first machine learning model and the second machine learning model to respectively generate a first machine learning prediction and a second machine learning prediction and determining whether to approve or deny the dispute request based further on the first machine learning prediction and the second machine learning prediction.

As shown, the series of acts 600 can also include an act 608 of sending an approval or denial determination. For example, this includes sending an approval or denial determination to the first digital system, determining to deny the dispute request comprises sending the dispute request, by the first digital system, to a device queue, and determining to approve the dispute request comprises automatically crediting, by the first digital system, a value to a user account corresponding to the dispute request. Further, in some cases, automatically crediting comprises crediting the value to the user account after a delayed time period determined by a randomized generator. Moreover, the act 608 also includes identifying an additional dispute request for which the second digital system fails to render an approval or denial determination and determining, by the first digital system, whether to approve or deny the dispute request based on a heuristic model for dispute-request values of the additional dispute request.

While FIG. 6 illustrates acts according to some embodiments, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6. Additionally, the acts described herein may be repeated or performed in parallel with one another or in parallel with different instances of the same or other similar acts.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
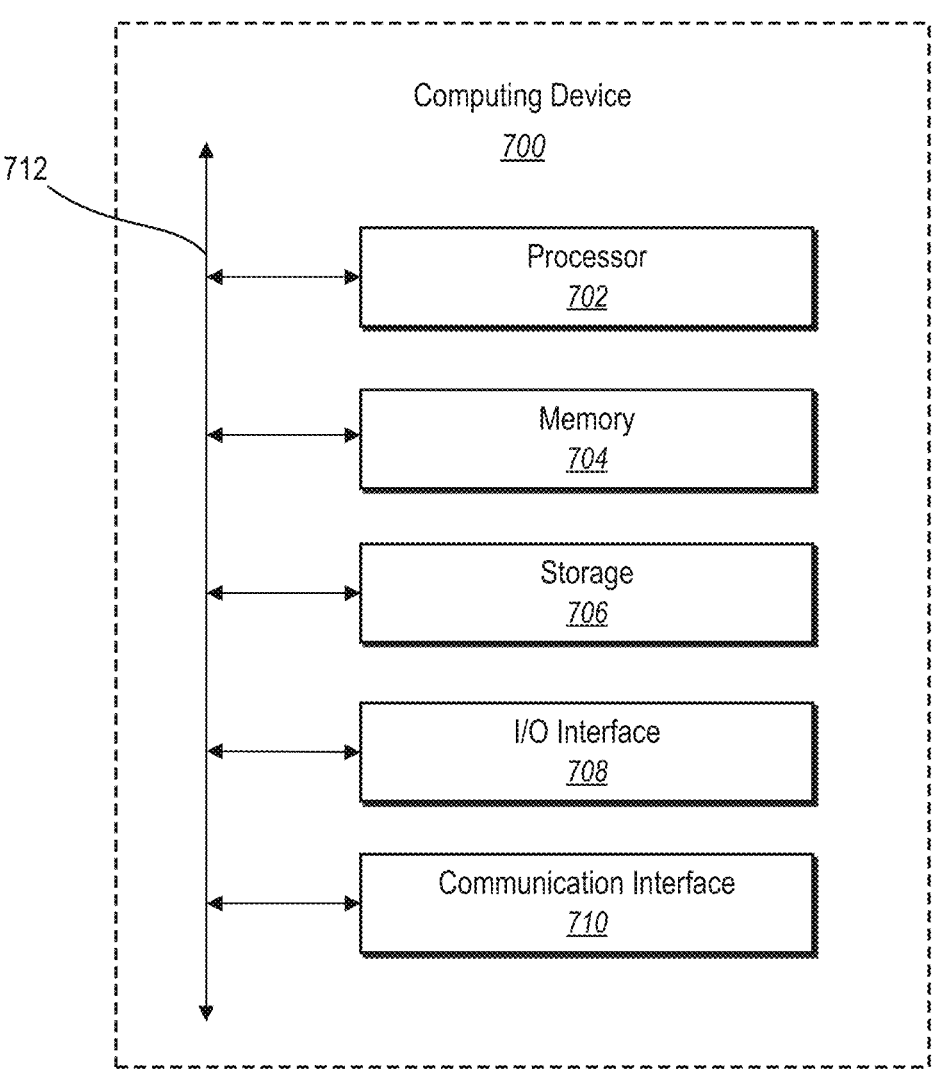
FIG. 7 illustrates a block diagram of a computing device for implementing one or more embodiments of the present disclosure.

FIG. 7 illustrates, in block diagram form, an exemplary computing device 700 (e.g., the client device 118, or the server(s) 106) that may be configured to perform one or more of the processes described above. As shown by FIG. 7, the computing device can comprise a processor 702, memory 704, a storage device 706, an I/O interface 708 interface 708, and a communication interface 710. In certain embodiments, the computing device 700 can include fewer or more components than those shown in FIG. 7. Components of computing device 700 shown in FIG. 7 will now be described in additional detail.

In particular embodiments, processor(s) 702 includes hardware for executing instructions, such as those making up a computer program. As an example, and not by way of limitation, to execute instructions, processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, storage device 706 can comprise a non-transitory storage medium described above. The storage device 706 may include a hard disk drive ("HDD"), flash memory, a Universal Serial Bus ("USB") drive or a combination of these or other storage devices.

The computing device 700 also includes one or more input or output interface 708 interface 708 (or "I/O interface 708"), which are provided to allow a user (e.g., requester or provider) to provide input to (such as user strokes), receive output from, and otherwise transfer data to and from the computing device 700. These I/O interface 708 may include a mouse, keypad or a keyboard, a touch screen, camera, optical scanner, network interface, modem, other known I/O devices or a combination of such I/O interface 708. The touch screen may be activated with a stylus or a finger.

The I/O interface 708 may include one or more devices for presenting output to a user, including, but not limited to, a graphics engine, a display (e.g., a display screen), one or more output providers (e.g., display providers), one or more audio speakers, and one or more audio providers. In certain embodiments, interface 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device and one or more other computing devices 700 or one or more networks. As an example, and not by way of limitation, communication interface 710 may include a network interface controller ("NIC") or network adapter for communicating with an Ethernet or other wire-based network or a wireless NIC ("WNIC") or wireless adapter for communicating with a wireless network, such as a WI-FI. The computing device

700 can further include a bus 712. The bus 712 can comprise hardware, software, or both that connects components of computing device 700 to each other.

Figure 8:
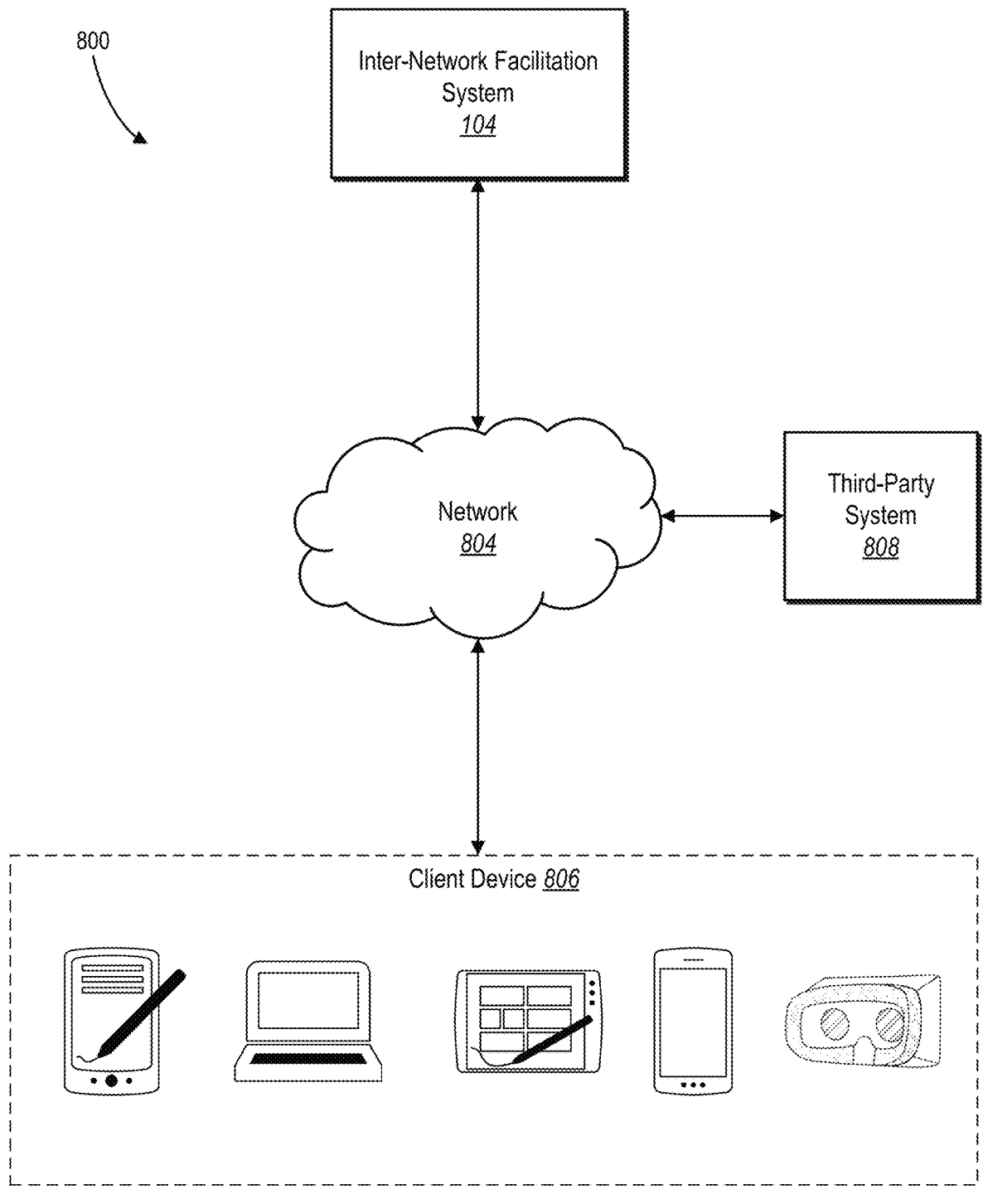
FIG. 8 illustrates an example environment for the inter-network facilitation system in accordance with one or more embodiments.

FIG. 8 illustrates an example network environment 800 of the inter-network facilitation system 104. The network environment 800 includes a client device 806 (e.g., client device 118), an inter-network facilitation system 104, and a third-party system 808 connected to each other by a network 804. Although FIG. 8 illustrates a particular arrangement of the client device 806, the inter-network facilitation system 104, the third-party system 808, and the network 804, this disclosure contemplates any suitable arrangement of client device 806, the inter-network facilitation system 104, the third-party system 808, and the network 804. As an example, and not by way of limitation, two or more of client device 806, the inter-network facilitation system 104, and the third-party system 808 communicate directly, bypassing network 804. As another example, two or more of client device 806, the inter-network facilitation system 104, and the third-party system 808 may be physically or logically co-located with each other in whole or in part.

Moreover, although FIG. 8 illustrates a particular number of client devices 806, inter-network facilitation systems 104, third-party systems 808, and networks 804, this disclosure contemplates any suitable number of client devices 806, inter-network facilitation system 104, third-party systems 808, and networks 804. As an example, and not by way of limitation, network environment 800 may include multiple client device 806, inter-network facilitation system 104, third-party systems 808, and/or networks 804.

This disclosure contemplates any suitable network 804. As an example, and not by way of limitation, one or more portions of network 804 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 804 may include one or more networks 804.

Links may connect client device 806 and third-party system 808 to network 804 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, the client device 806 may be an electronic device including hardware, software, or embedded logic components or a combination of two or more such components and capable of carrying out the appropriate functionalities implemented or supported by client device 806. As an example, and not by way of limitation, a client device 806 may include any of the computing devices discussed above in relation to FIG. 8. A client device 806 may enable a network user at the client device 806 to access network 804. A client device 806 may enable its user to communicate with other users at other client devices 806.

In particular embodiments, the client device 806 may include a requester application or a web browser, such as MICROSOFT INTERNET EXPLORER, GOOGLE CHROME, or MOZILLA FIREFOX, and may have one or more add-ons, plug-ins, or other extensions, such as TOOL-BAR or YAHOO TOOLBAR. A user at the client device 806 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 806 one or more Hyper Text Markup Language ("HTML") files responsive to the HTTP request. The client device 806 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 804) to link the third-party-system 808. For example, the inter-network facilitation system 104 may receive authentication credentials from a user to link a third-party system 808 such as an online bank account, credit account, debit account, or other financial account to a user account within the inter-network facilitation system 104. The inter-network facilitation system 104 can subsequently communicate with the third-party system 808 to detect or identify balances, transactions, withdrawal, transfers, deposits, credits, debits, or other transaction types associated with the third-party system 808. The inter-network facilitation system 104 can further provide the aforementioned or other financial information associated with the third-party system 808 for display via the client device 806. In some cases, the inter-network facilitation system 104 links more than one third-party system 808, receiving account information for accounts associated with each respective third-party system 808 and performing operations or transactions between the different systems via authorized network connections.

In particular embodiments, the inter-network facilitation system 104 may interface between an online banking system and a credit processing system via the network 804. For example, the inter-network facilitation system 104 can provide access to a bank account of a third-party system 808 and linked to a user account within the inter-network facilitation system 104. Indeed, the inter-network facilitation system 104 can facilitate access to, and transactions to and from, the bank account of the third-party system 808 via a client application of the inter-network facilitation system 104 on the client device 806. The inter-network facilitation system 104 can also communicate with a credit processing system, an ATM system, and/or other financial systems (e.g., via the network 804) to authorize and process credit charges to a credit account, perform ATM transactions, perform transfers (or other transactions) across accounts of different third-party systems 808, and to present corresponding information via the client device 806.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 808), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 800 either directly or via network 804. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 806, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 804.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 806. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 806. Information may be pushed to a client device 806 as notifications, or information may be pulled from client device 806 responsive to a request received from client device 806. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 806 associated with users.

In addition, the third-party system 808 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 804. A third-party system 808 can communicate with the inter-network facilitation system 104 to provide financial information pertaining to balances, transactions, and other information, whereupon the inter-network facilitation system 104 can provide corresponding information for display via the client device 806. In particular embodiments, a third-party system 808 communicates with the inter-network facilitation system 104 to update account balances, transaction histories, credit usage, and other internal information of the inter-network facilitation system 104 and/or the third-party system 808 based on user interaction with the inter-network facilitation system 104 (e.g., via the client device 806). Indeed, the inter-network facilitation system 104 can synchronize information across one or more third-party systems 808 to reflect accurate account information (e.g., balances, transactions, etc.) across one or more networked systems, including instances where a transaction (e.g., a transfer) from one third-party system 808 affects another third-party system 808.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

identifying a first request associated with a first network transaction;

receiving, from a first digital system, a first policy identifier and a first set of request values corresponding to the first request associated with the first network transaction;

determining, by a second digital system, whether to approve or deny the first request by mapping the first set of request values to a first set of digital policy criteria that corresponds to the first policy identifier;

sending a first approval or denial determination to the first digital system;

modifying, based on receiving a modification request via a client device, the first set of digital policy criteria to generate a second set of digital policy criteria that corresponds to the first policy identifier;

identifying a second request associated with a second network transaction;

receiving, from the first digital system, the first policy identifier and a second set of request values corresponding to the second request associated with the second network transaction;

determining, by the second digital system, whether to approve or deny the second request by mapping the second set of request values to the second set of digital policy criteria that corresponds with the first policy identifier; and sending a second approval or denial determination to the first digital system.

2. The computer-implemented method of claim 1, wherein modifying the first set of digital policy criteria comprises:

receiving a payload from the first digital system, the payload comprising the first policy identifier and the second set of digital policy criteria determined based on the modification request received via the client device; and in response to receiving the payload, replacing, by the second digital system, the first set of digital policy criteria with the second set of digital policy criteria.

3. The computer-implemented method of claim 1, further comprising determining whether to approve or deny the first network transaction by mapping, by the second digital system, a first set of request values for the first network transaction to the first set of digital policy criteria.

4. The computer-implemented method of claim 1, further comprising:

identifying a third request associated with a third network transaction;

receiving, from the first digital system, a second policy identifier and a third set of request values corresponding to the third request associated with the third network transaction; and determining, by the second digital system, whether to approve or deny the third request by mapping the third set of request values to a third set of digital policy criteria that corresponds to the second policy identifier.

5. The computer-implemented method of claim 1, further comprising selecting, by the second digital system, a machine learning model from a plurality of machine learning models according to the first set of digital policy criteria.

6. The computer-implemented method of claim 5, further comprising utilizing the machine learning model to determine whether to approve or deny the first network transaction.

7. The computer-implemented method of claim 1, wherein determining to deny the first network transaction comprises transmitting the first network transaction, by the first digital system, to a device queue.

8. The computer-implemented method of claim 1, wherein determining to approve the first network transaction comprises:

automatically executing an action corresponding to the first network transaction; or automatically executing an action corresponding to the first network transaction after a delayed time period determined by a randomized generator.

9. A non-transitory computer-readable medium storing instructions that, when executed by at least one processor, cause a system to:

identify a first request associated with a first network transaction;

receive, from an additional system, a first policy identifier and a first set of request values corresponding to the first request associated with the first network transaction;

determine, by the system, whether to approve or deny the first request by mapping the first set of request values to a first set of digital policy criteria that corresponds to the first policy identifier;

send a first approval or denial determination to the additional system;

modify, based on receiving a modification request via a client device, the first set of digital policy criteria to generate a second set of digital policy criteria that corresponds to the first policy identifier;

identify a second request associated with a second network transaction;

receive, from the additional system, the first policy identifier and a second set of request values corresponding to the second request associated with the second network transaction;

determine, by the system, whether to approve or deny the second request by mapping the second set of request values to the second set of digital policy criteria that corresponds with the first policy identifier; and send a second approval or denial determination to the additional system.

10. The non-transitory computer-readable medium of claim 9, further comprising instructions that, when executed by the at least one processor, cause the system to modify the first set of digital policy criteria by:

receiving a payload from the additional system, the payload comprising the first policy identifier and the second set of digital policy criteria determined based on the modification request received via the client device; and in response to receiving the payload, replacing, by the system, the first set of digital policy criteria with the second set of digital policy criteria.

11. The non-transitory computer-readable medium of claim 9, further comprising instructions that, when executed by the at least one processor, cause the system to determine whether to approve or deny the first network transaction by mapping, by the system, a first set of request values for the first network transaction to the first set of digital policy criteria.

12. The non-transitory computer-readable medium of claim 9, further comprising instructions that, when executed by the at least one processor, cause the system to:

identify a third request associated with a third network transaction;

receive, from the additional system, a second policy identifier and a third set of request values corresponding to the third request associated with the third network transaction; and determine, by the system, whether to approve or deny the third request by mapping the third set of request values to a third set of digital policy criteria that corresponds to the second policy identifier.

13. The non-transitory computer-readable medium of claim 9, further comprising instructions that, when executed by the at least one processor, cause the system to:

select, by the system, a machine learning model from a plurality of machine learning models according to the first set of digital policy criteria; and utilize the machine learning model to determine whether to approve or deny the first network transaction.

14. The non-transitory computer-readable medium of claim 9, further comprising instructions that, when executed by the at least one processor, cause the system to transmit the first network transaction, by the additional system, to a device queue.

15. A system comprising:

at least one processor; and at least one non-transitory computer-readable storage medium storing instructions that, when executed by the at least one processor, cause the system to:

identify a first request associated with a first network transaction;

receive, from an additional system, a first policy identifier and a first set of request values corresponding to the first request associated with the first network transaction;

determine, by the system, whether to approve or deny the first request by mapping the first set of request values to a first set of digital policy criteria that corresponds to the first policy identifier;

send a first approval or denial determination to the additional system;

modify, based on receiving a modification request via a client device, the first set of digital policy criteria to generate a second set of digital policy criteria that corresponds to the first policy identifier;

identify a second request associated with a second network transaction;

receive, from the additional system, the first policy identifier and a second set of request values corresponding to the second request associated with the second network transaction;

determine, by the system, whether to approve or deny the second request by mapping the second set of request values to the second set of digital policy criteria that corresponds with the first policy identifier; and send a second approval or denial determination to the additional system.

16. The system of claim 15, further comprising instructions that, when executed by the at least one processor, cause the system to modify the first set of digital policy criteria by:

receiving a payload from the additional system, the payload comprising the first policy identifier and the second set of digital policy criteria determined based on the modification request received via the client device; and in response to receiving the payload, replacing, by the system, the first set of digital policy criteria with the second set of digital policy criteria.

17. The system of claim 15, further comprising instructions that, when executed by the at least one processor, cause the system to determine whether to approve or deny the first network transaction by mapping, by the system, a first set of request values for the first network transaction to the first set of digital policy criteria.

18. The system of claim 15, further comprising instructions that, when executed by the at least one processor, cause the system to:

identify a third request associated with a third network transaction;

receive, from the additional system, a second policy identifier and a third set of request values corresponding to the third request associated with the third network transaction; and determine, by the system, whether to approve or deny the third request by mapping the third set of request values to a third set of digital policy criteria that corresponds to the second policy identifier.

19. The system of claim 15, further comprising instructions that, when executed by the at least one processor, cause the system to:

select, by the system, a machine learning model from a plurality of machine learning models according to the first set of digital policy criteria; and utilize the machine learning model to determine whether to approve or deny the first network transaction.

20. The system of claim 15, further comprising instructions that, when executed by the at least one processor, cause the system to approve the first network transaction by:

automatically executing an action corresponding to the first network transaction; or automatically executing an action corresponding to the first network transaction after a delayed time period determined by a randomized generator.

* * * * *